(12) United States Patent
Maalouf et al.

(10) Patent No.: US 11,533,283 B1
(45) Date of Patent: Dec. 20, 2022

(54) VOICE USER INTERFACE SHARING OF CONTENT

(71) Applicant: Amazon Technologies, Inc., Seattle, WA (US)

(72) Inventors: Wadih Maalouf, Seattle, WA (US); Nicholas Berardi, Issaquah, WA (US); Phani Polina, Issaquah, WA (US); Kwang Ho Ok, Bothell, WA (US); Ganesh Basavaraj Mamadapur, Seattle, WA (US); Gabriella Diane Snyder, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 17/099,058

(22) Filed: Nov. 16, 2020

(51) Int. Cl.
| | |
|---|---|
| *H04L 51/08* | (2022.01) |
| *G10L 15/26* | (2006.01) |
| *G10L 15/18* | (2013.01) |
| *H04L 51/046* | (2022.01) |
| *H04L 51/02* | (2022.01) |
| *H04L 51/52* | (2022.01) |
| *G06F 16/955* | (2019.01) |

(52) U.S. Cl.
CPC .......... *H04L 51/08* (2013.01); *G10L 15/1822* (2013.01); *G10L 15/26* (2013.01); *H04L 51/02* (2013.01); *H04L 51/046* (2013.01); *H04L 51/52* (2022.05); *G06F 16/9566* (2019.01)

(58) Field of Classification Search
None
See application file for complete search history.

(56) References Cited

U.S. PATENT DOCUMENTS

| | | | | |
|---|---|---|---|---|
| 2008/0085682 | A1* | 4/2008 | Rao | H04W 4/023 455/74 |
| 2011/0112921 | A1* | 5/2011 | Kennewick | G06Q 30/0601 705/26.1 |
| 2013/0124691 | A1* | 5/2013 | Suryavanshi | H04L 67/55 709/219 |
| 2019/0173818 | A1* | 6/2019 | Friedman | H04L 51/063 |
| 2021/0082470 | A1* | 3/2021 | Cramer | G06F 3/167 |
| 2021/0142798 | A1* | 5/2021 | Pulicharla | G10L 15/24 |

FOREIGN PATENT DOCUMENTS

WO WO-2019021048 A1 * 1/2019

\* cited by examiner

*Primary Examiner* — Natisha D Cox
(74) *Attorney, Agent, or Firm* — Pierce Atwood LLP

(57) ABSTRACT

Techniques for sharing content using a voice user interface are described. A user may speak an input to share content presently being output by a device as audio and or displayed content. A backend system may determine the presently being output content, and generate message payload data representing the content. The backend system may also perform processing to determine an intended recipient of the content. The backend system may send the message payload data to the recipient using various modalities.

20 Claims, 14 Drawing Sheets

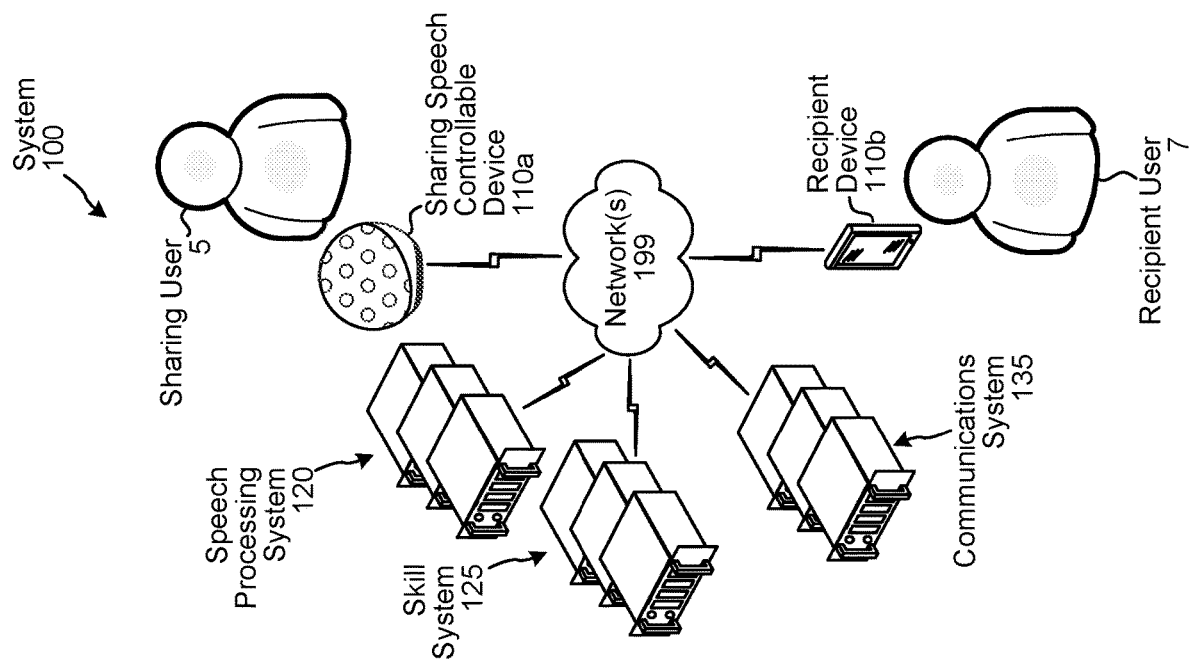
FIG. 1
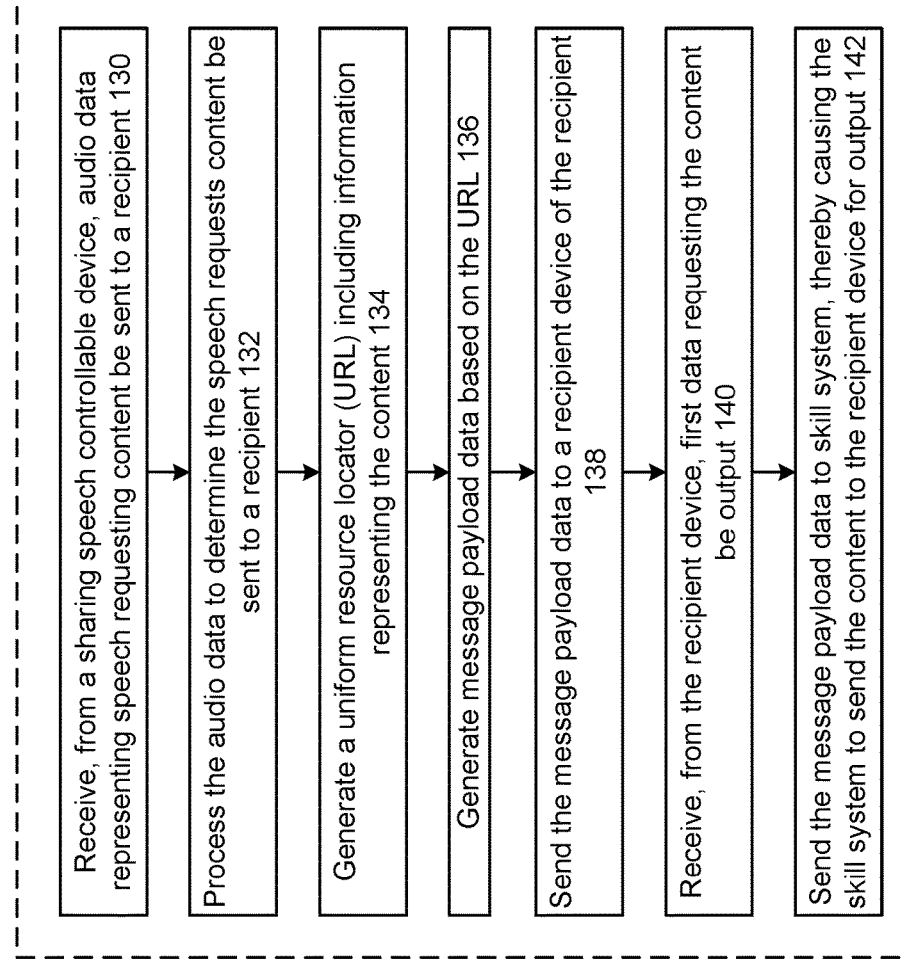

VOICE USER INTERFACE SHARING OF CONTENT

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to share content using a voice user interface (VUI), according to embodiments of the present disclosure.

DETAILED DESCRIPTION

Figure 2:
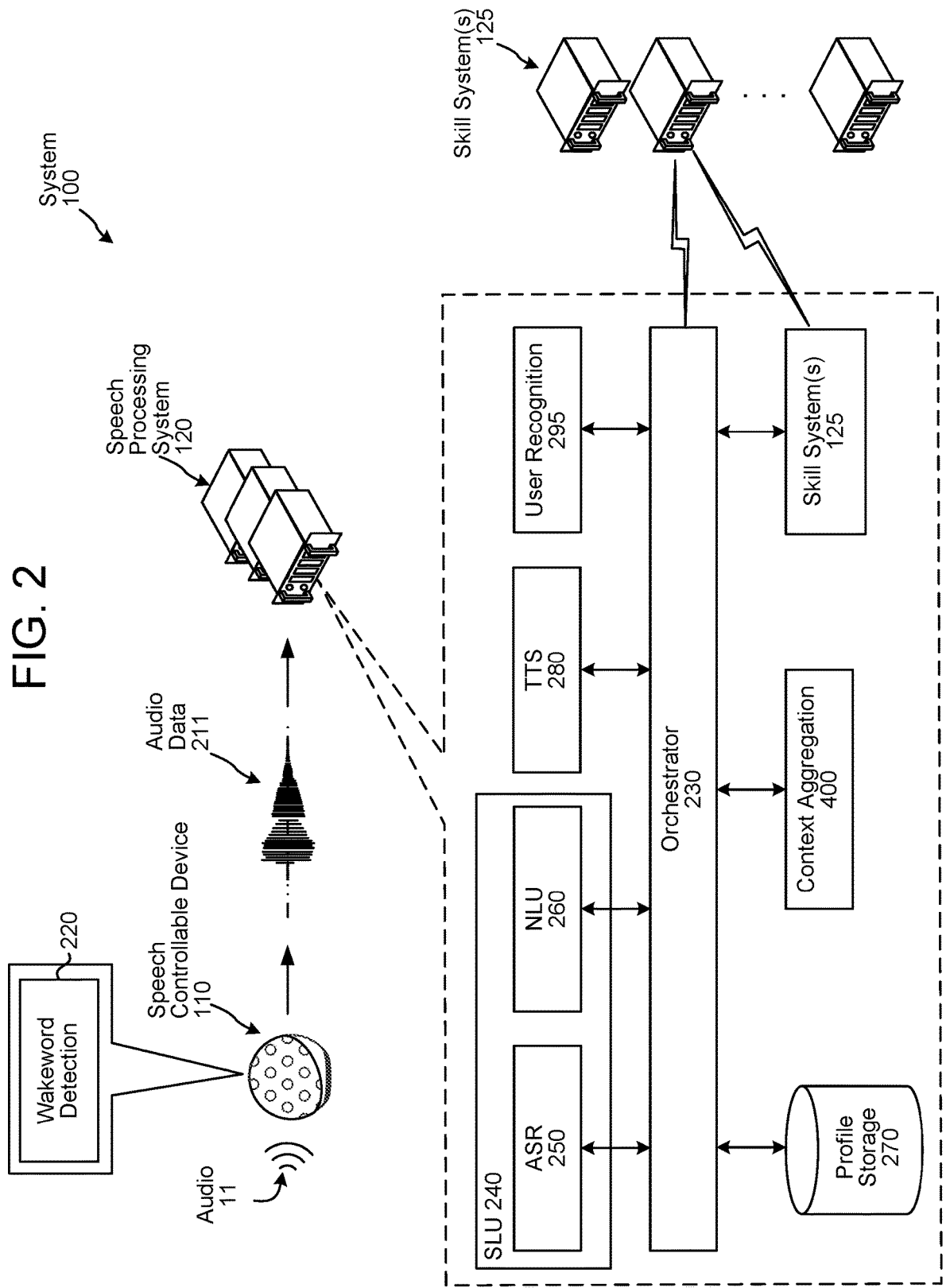
FIG. 2 is a conceptual diagram of components of a system, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A system may be configured to perform actions responsive to user inputs. For example, for the user input "play music by [artist name]," the system may output music sung by the indicated artist. For further example, for the user input "turn on the lights," the system may turn on lights based on where the user is located. In another example, for the user input "what is today's weather," the system may output synthesized speech of weather information based on where the user is located.

The present disclosure relates to techniques for enabling a user to share content (e.g., music, news, an article, photos, a recipe, an electronic shopping cart, a social media post, a Voice over Internet Protocol (VoIP) link, etc.) using a voice user interface. For example, a user may initiate sharing of a song that is being played at a device by speaking "share this song." The device playing the song and receiving the user input may be a speech controllable device of the system. For further example, a user may initiate sharing of a photo that is being displayed at a device by speaking "share this photo with Bob."

When the system receives a spoken natural language input to share content, the system may invoke a skill capable of outputting the content to be shared. For example, if music is to be shared, the system may invoke a music skill. For further example, if a photo is to be shared, the system may invoke a photo skill.

As used herein, a "skill" may refer to software executed by a processing component, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill may output music sung by the indicated artist. For further example, for the spoken natural language input "turn on the lights," a skill may cause one or more "smart" lights to operate in an "on" state. In another example, for the spoken natural language input "what is the weather," a skill may output weather information for a geographic location corresponding to the device that captured the spoken natural language input. What is described herein as a skill may be referred to using different terms, such as an action, bot, application, processing component, or the like.

In response to being invoked, the skill may generate a representation of the content to be shared. In some embodiments, the skill may generate a uniform resource locator (URL) representing the shared content. For example, if a song is shared, a music skill may generate a URL including information such as song title, artist name, album name, etc. For further example, if a recipe is shared, a recipe skill may generate a URL including information such as a recipe title, a publisher of the recipe, etc.

The system may thereafter send a message to a recipient device, with a message payload representing the content being shared. For example, the message payload may be "[Sharing user name] shared a song with you. Would you like to listen to it?" For further example, the message payload may be "[Sharing user name] shared a recipe with you. Would you like me to tell you about the recipe?" In response to the recipient user indicating the recipient user wants to receive the shared content, the system may output the content to the recipient user. For example, the system may output audio of a song, may output synthesized speech corresponding to a recipe, etc.

Teaching of the present disclosure, among other things, improves the user experience by allowing users to share content using speech.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to share content using a voice user interface (VUI). Although the figures and discussion of the present disclosure illustrate certain steps in a particular order, the steps described may be performed in a different order (as well as certain steps removed or added) without departing from the present disclosure. As shown in FIG. 1, the system 100 may include a sharing speech controllable device 110a (local to a sharing user 5), a recipient device 110b (local to a recipient user 7), a speech processing system 120, a skill system 125, and a communications system 135 in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The sharing user 5 may speak a natural language input to the sharing speech controllable device 110a, with the spoken natural language input requesting the sharing of content with a recipient user 7. For example, the spoken natural language input may be "share this music with Bob," in which "Bob" is the recipient user 7 and the content is music presently being output by the sharing speech controllable device 110a, or another speaker(s) in communication with the sharing speech controllable device 110a. For further example, the spoken natural language input may be "share this photo with Jane," in which "Jane" is the recipient user 7 and the content is a photo presently being displayed by the sharing speech controllable device 110a (via a display associated with the sharing speech controllable device 110a). The sharing speech controllable device 110a receives the spoken natural language input as audio, generates audio data representing the audio, and sends the audio data to the speech processing system 120, which the speech processing system 120 receives (130).

The speech processing system 120 processes (132) the audio data to determine the speech requests content be sent to a recipient. For example, the speech processing system 120 may perform ASR processing on the audio data to generate ASR output data, and may perform NLU processing on the ASR output data to generate NLU output data representing content is to be sent to a recipient. Alternatively, the speech processing system 120 may perform SLU processing on the audio data to generate the NLU output data.

Upon determining the speech requests content be sent to a recipient, the speech processing system 120 may send a device identifier, of the sharing speech controllable device 110a, to a skill system 125 configured to output the content. For example, if the content to be shared is a song, the speech processing system 120 may send the device identifier to a music skill system. For further example, if the content to be shared is a photo, the speech processing system 120 may send the device identifier to a photo skill system. In another example, if the content to be shared is a recipe, the speech processing system 120 may send the device identifier to a recipe skill system.

The skill system 125 may query a context component, of the speech processing system 120, for context data associated with the device identifier, with the context data representing content currently being output by the sharing speech controllable device 110a. For example, the context data may represent the sharing speech controllable device 110a is outputting music, is displaying a photo, is displaying a recipe, is displaying an electronic shopping cart, etc.

The skill system 125 may (134) generate a uniform resource locator (URL) representing the content represented in the context data. For example, if the context data represents a song is being output, the URL may include information such as a song name, an artist name, an album name, etc. For further example, if the context data represents a photo is being displayed, the URL may include information such as a photo name, a file identifier representing where the photo is stored, etc. In another example, if the context data represents a recipe is being displayed, the URL may include information such as a recipe name, a publisher of the recipe, etc.

The skill system 125 may generate (136) message payload data based on the URL. The skill system 125 may extract fields from the URL, and convert them into a standard format (i.e., the message payload data). The skill system 125 may use a metadata extractor to identify tags in the URL, and render the data of the tags into the standard format to generate the message payload data. The metadata extractor may be a commercially available metadata extractor, or a metadata extractor implementing one or more proprietary extraction techniques.

The skill system 125 may communicate with the communications system 135 to send (138) the message payload data to the recipient device 110b. For example, the recipient device 110b may be a displayless/headless device, or a device including or otherwise associated with a display, such as a smart phone, tablet, etc.

The recipient device 110b may display natural language text and/or output synthesized speech derived from the message payload data. For example, if the message payload data includes a name of the sharing user 5 and a song name, the natural language text and/or synthesized speech may be "[sharing user 5 name] shared [song name] with you. Would you like to listen to it?" For further example, if the message payload data includes a name of the sharing user 5 and an indication that the content being shared is a photo, the natural language text and/or synthesized speech may be "[sharing user 5 name] shared a photo with you. Would you like to see it?" In another example, if the message payload data includes a name of the sharing user 5 and a recipe name, the natural language text and/or synthesized speech may be "[sending user 5 name] shared a [recipe name] recipe with you. Would you like to view it?"

In response to displaying the natural language text and/or outputting the synthesized speech, the recipient device 110b may receive a user input indicating the recipient user 7 wants the content output. For example, the recipient device 110b may receive audio corresponding to a spoken natural language input requesting the content be output. In another example, the recipient device 110b may receive a text-based (e.g., typed) natural language input requesting the content be output. For further example, the recipient device 110b may include or be in communication with a camera that captures a sequence of images representing the recipient user 7 performing a gesture (a type of user input) to cause the content to be output. In another example, the recipient device 110b may display a virtual button and detect the recipient user 7 interacting with the button (with the button interaction being a type of user input).

The recipient device 110b outputs (and the communications system 135 receives (140)) first data representing the recipient user's input. For example, the first data may be audio data when the recipient device 110b receives a spoken natural language input. In another example, the first data may be text data when the recipient device 110b receives a text-based (e.g., typed) natural language input. For further example, the first data may be image data when the recipient device 110b receives a sequence of images representing the recipient user 7 performing a gesture. Or the recipient device 110b may process the sequence of images to determine the gesture, and may send an indication of the gesture to the speech processing system 120. In another example, when the recipient device 110b detects the recipient user 7 interacting with the button, the recipient device 110b may send first data (representing the button interaction) to the speech processing system 120.

In response to receiving the first data from the recipient device 110b, the communications system 135 may send (142) the message payload data to the skill system 125 that generated the URL as described above. In response to receiving the message payload data, the skill system 125 may determine the content corresponding to the message payload data (e.g., audio data corresponding to a song, image data corresponding to a photo, text data corresponding to a recipe, etc.) and may send the content to the recipient device 110b for output to the recipient user 7.

The system 100 may operate using various components as illustrated in FIG. 2. The various components may be located on a same or different physical devices. Communication between various components may occur directly or across a network(s) 199.

A microphone or array of microphones (of or otherwise associated with the speech controllable device 110) may capture audio 11. The speech controllable device 110 processes audio data, representing the audio 11, to determine whether speech is detected. The speech controllable device 110 may use various techniques to determine whether audio data includes speech. In some examples, the speech controllable device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the speech controllable device 110 may implement a classifier configured to distinguish speech from background noise. The classifier may be implemented by techniques such as linear classifiers, support vector machines, and decision trees. In still other examples, the speech controllable device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the speech controllable device 110 may determine if the speech is directed at the speech controllable device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the speech controllable device 110 may "wake" and begin transmitting audio data 211, representing the audio 11, to the speech processing system 120. The audio data 211 may include data corresponding to the detected wakeword, or the speech controllable device 110 may remove the portion of the audio corresponding to the detected wakeword prior to sending the audio data 211 to the speech processing system 120.

The speech processing system 120 may include an orchestrator component 230 configured to, among other things, coordinate data transmissions between components of the speech processing system 120. The orchestrator component 230 may receive the audio data 211 from the speech controllable device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the speech controllable device 110 receiving audio 11, the speech controllable device 110 may receive a text-based (e.g., typed) natural language input. The speech controllable device 110 may determine text data 213 representing the typed natural language input, and may send the text data 213 to the speech processing system 120, wherein the text data 213 is received by the orchestrator component 230. The orchestrator component 230 may send the text data 213 or ASR output data output, depending on the type of natural language input received, to a NLU component 260.

The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill system.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill system). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill system may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill system, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skill systems. One skill system may support the same or different intents than another skill system. Thus, the NLU output data may include multiple NLU hypotheses, with each NLU hypothesis corresponding to IC processing and NER processing performed on the ASR output or text data with respect to a different skill system.

As described above, the speech processing system 120 may perform speech processing using two different components (e.g., the ASR component 250 and the NLU component 260). In at least some embodiments, the speech processing system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the speech processing system 120) may send the NLU output data to the orchestrator component 230. The orchestrator component 230 may send the NLU output data to a skill system.

The speech processing system 120 may include or otherwise communicate with one or more skill systems 125. As mentioned herein above, as used herein a "skill system" may refer to software, that may be placed on a machine or a virtual machine (e.g., software that may be launched in a virtual instance when called), configured to perform one or more actions in response to user inputs (such as spoken natural language inputs). For example, for the spoken natural language input "play music by <artist>," a skill system 125 may output music sung by the indicated artist. For further example, for the spoken natural language input "turn on the lights," a skill system 125 may cause one or more "smart" lights to operate in an "on" state. In another example, for the spoken natural language input "what is the weather," a skill system 125 may output weather information for a geographic location corresponding to the device that captured the spoken natural language input. What is described herein as a skill system 125 may be referred to using different terms, such as an action, bot, application, or the like. Inputs to a skill system 125 may come from speech processing interactions or through other interactions or input sources.

A skill system 125 may be associated with a domain, a non-limiting list of which includes a smart home domain, a music domain, a video domain, a weather domain, a communications domain, a flash briefing domain, a shopping domain, and a custom domain.

The speech processing system 120 may include a TTS component 280 that determine audio data (e.g., synthesized speech) from text data using one or more different methods. Text data input to the TTS component 280 may come from a skill system, the orchestrator component 230, or another component of the speech processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The speech processing system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the speech controllable device 110 that determined the audio data 211). The user recognition component 295 may additionally or alternatively perform user recognition by comparing biometric data (e.g., fingerprint data, iris data, retina data, etc.), received by the speech processing system 120 in correlation with a natural language input, to stored biometric data of users (e.g., stored biometric data associated with user profile identifiers associated with the speech controllable device 110 that determined the audio data 211 or otherwise captured a user input). The user recognition component 295 may additionally or alternatively perform user recognition by comparing image data (e.g., including a representation of at least a feature of a user), received by the speech processing system 120 in correlation with a natural language input, with stored image data including representations of features of different users (e.g., stored image data associated with user profile identifiers associated with the speech controllable device 110 that determined the audio data 211 or otherwise captured a user input). The user recognition component 295 may perform other or additional user recognition processes, including those known in the art. For a particular user input, the user recognition component 295 may perform processing with respect to stored data of users associated with the speech controllable device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill system, as well as processing performed by other components of the speech processing system 120 and/or other systems.

The speech processing system 120 may include profile storage 270. The profile storage 270 may include a variety of data related to individual users, groups of users, devices, etc. that interact with the speech processing system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skill systems that the user has enabled. When a user enables a skill system, the user is providing the speech processing system 120 with permission to allow the skill system to execute with respect to the user's natural language inputs. If a user does not enable a skill system, the speech processing system 120 may not invoke the skill system to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 3:
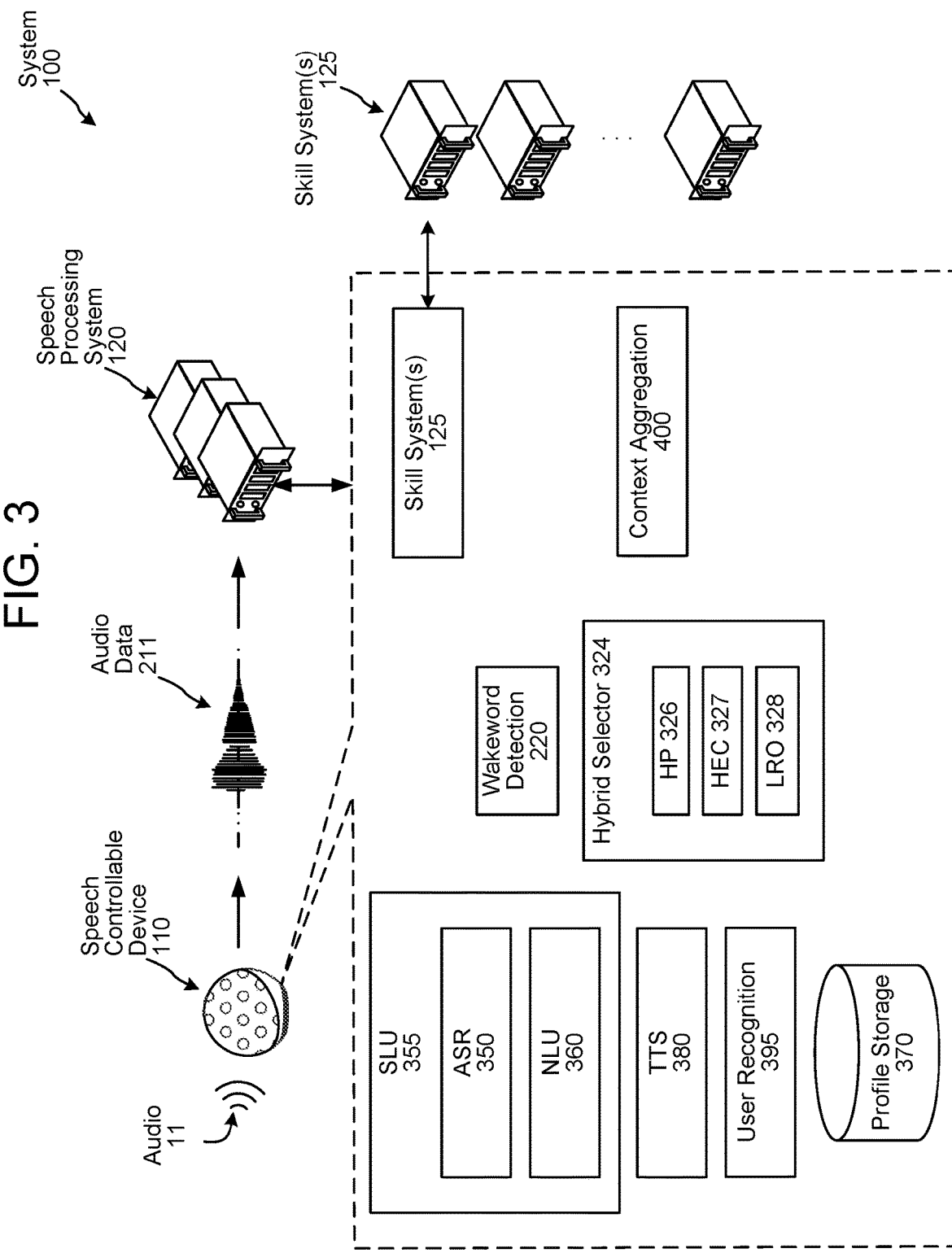
FIG. 3 is a conceptual diagram of components of a device, according to embodiments of the present disclosure.

The foregoing describes illustrative components and processing of the speech processing system 120. The following describes illustrative components and processing of the speech controllable device 110. As illustrated in FIG. 3, in at least some embodiments, the speech processing system 120 may receive the audio data 211 from the speech controllable device 110, to recognize speech corresponding to a spoken input in the received audio data 211, and to perform functions in response to the recognized speech. In at least some embodiments, these functions involve sending directives (e.g., commands), from the speech processing system 120 to the speech controllable device 110 (and/or other devices 110) to cause the speech controllable device 110 to perform an action, such as output an audible response to the spoken input via a loudspeaker(s), and/or control secondary devices in the environment by sending a control command to the secondary devices.

Thus, when the speech controllable device 110 is able to communicate with the speech processing system 120 over the network(s) 199, some or all of the functions capable of being performed by the speech processing system 120 may be performed by sending one or more directives over the network(s) 199 to the speech controllable device 110, which, in turn, may process the directive(s) and perform one or more corresponding actions. For example, the speech processing system 120, using a remote directive that is included in response data (e.g., a remote response), may instruct the speech controllable device 110 to output an audible response (e.g., using TTS processing performed by an on-device TTS component 380) to a user's question via a loudspeaker(s) of (or otherwise associated with) the speech controllable device 110, to output content (e.g., music) via the loudspeaker(s) of (or otherwise associated with) the speech controllable device 110, to display content on a display of (or otherwise associated with) the speech controllable device 110, and/or to send a directive to a secondary device (e.g., a directive to turn on a smart light). It is to be appreciated that the speech processing system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the speech controllable device 110 may include a wakeword detection component 220 configured to compare the audio data 211 to stored models used to detect a wakeword (e.g., "Alexa") that indicates to the speech controllable device 110 that the audio data 211 is to be processed for determining NLU output data (e.g., slot data that corresponds to a named entity, label data, and/or intent data, etc.). In at least some embodiments, a hybrid selector 324, of the speech controllable device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the speech processing system 120 and/or an on-device ASR component 350. The wakeword detection component 220 may also send an indication, to the hybrid selector 324, representing a wakeword was not detected. In response to receiving such an indication, the hybrid selector 324 may refrain from sending the audio data 211 to the speech processing system 120, and may prevent the ASR component 350 from further processing the audio data 211. In this situation, the audio data 211 can be discarded.

The speech controllable device 110 may conduct its own speech processing using on-device language processing components, such as an SLU component 355 (the ASR component 350 and an NLU 360), similar to the manner discussed above with respect to the SLU component 255 (or ASR component 250 and the NLU component 260) of the speech processing system 120. The speech controllable device 110 may also internally include, or otherwise have access to, other components such as one or more skill systems 125 capable of executing commands based on NLU output data or other results determined by the speech controllable device 110/system 120, a user recognition component 395 (configured to process in a similar manner to that discussed above with respect to the user recognition component 295 of the speech processing system 120), profile storage 370 (configured to store similar profile data to that discussed above with respect to the profile storage 270 of the speech processing system 120), and other components. In at least some embodiments, the profile storage 370 may only store profile data for a user or group of users specifically associated with the speech controllable device 110.

In at least some embodiments, the on-device language processing components may not have the same capabilities as the language processing components of the speech processing system 120. For example, the on-device language processing components may be configured to handle only a subset of the natural language inputs that may be handled by the speech processing system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the speech processing system 120. If the speech controllable device 110 attempts to process a natural language input for which the on-device language processing components are not necessarily best suited, the language processing results determined by the speech controllable device 110 may indicate a low confidence or other metric indicating that the processing by the speech controllable device 110 may not be as accurate as the processing done by the speech processing system 120.

The hybrid selector 324, of the speech controllable device 110, may include a hybrid proxy (HP) 326 configured to proxy traffic to/from the speech processing system 120. For example, the HP 326 may be configured to send messages to/from a hybrid execution controller (HEC) 327 of the hybrid selector 324. For example, command/directive data received from the speech processing system 120 can be sent to the HEC 327 using the HP 326. The HP 326 may also be configured to allow the audio data 211 to pass to the speech processing system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the speech controllable device 110 receives directive data from the speech processing system 120 and chooses to use that remotely-determined directive data.

Thus, when the audio data 211 is received, the HP 326 may allow the audio data 211 to pass through to the speech processing system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the speech processing system 120 or the on-device language processing components. However, the disclosure is not limited thereto, and in some examples the hybrid selector 324 may send the audio data 211 only to the on-device ASR component 350 without departing from the disclosure. For example, the speech controllable device 110 may process the audio data 211 on-device without sending the audio data 211 to the speech processing system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

A NLU hypothesis (output by the NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the speech processing system 120, assuming a remote response is even received (e.g., when the speech controllable device 110 is able to access the speech processing system 120 over the network(s) 199), or to determine output audio requesting additional information from the user 5.

The speech controllable device 110 and/or the speech processing system 120 may associate a unique identifier with each natural language input. The speech controllable device 110 may include the unique identifier when sending the audio data 211 to the speech processing system 120, and the response data from the speech processing system 120 may include the unique identifier to identify which natural language input the response data corresponds.

In at least some embodiments, the speech controllable device 110 may include, or be configured to use, one or more skill systems 125 that may work similarly to the skill system(s) 125. The skill system(s) 125 may correspond to one or more domains that are used in order to determine how to act on a spoken input in a particular way, such as by outputting a directive that corresponds to the determined intent, and which can be processed to implement the desired operation. The skill system(s) 125 installed on (or in communication with) the speech controllable device 110 may include, without limitation, a smart home skill system (or smart home domain) and/or a device control skill system (or device control domain) to execute in response to spoken inputs corresponding to an intent to control a second device(s) in an environment, a music skill system (or music domain) to execute in response to spoken inputs corresponding to a intent to play music, a navigation skill system (or a navigation domain) to execute in response to spoken input corresponding to an intent to get directions, a shopping skill system (or shopping domain) to execute in response to spoken inputs corresponding to an intent to buy an item from an electronic marketplace, and/or the like.

In at least some embodiments, some or all of the functionality, described herein as being provided by the speech processing system 120, may instead by provided by the speech controllable device 110.

Figure 4:
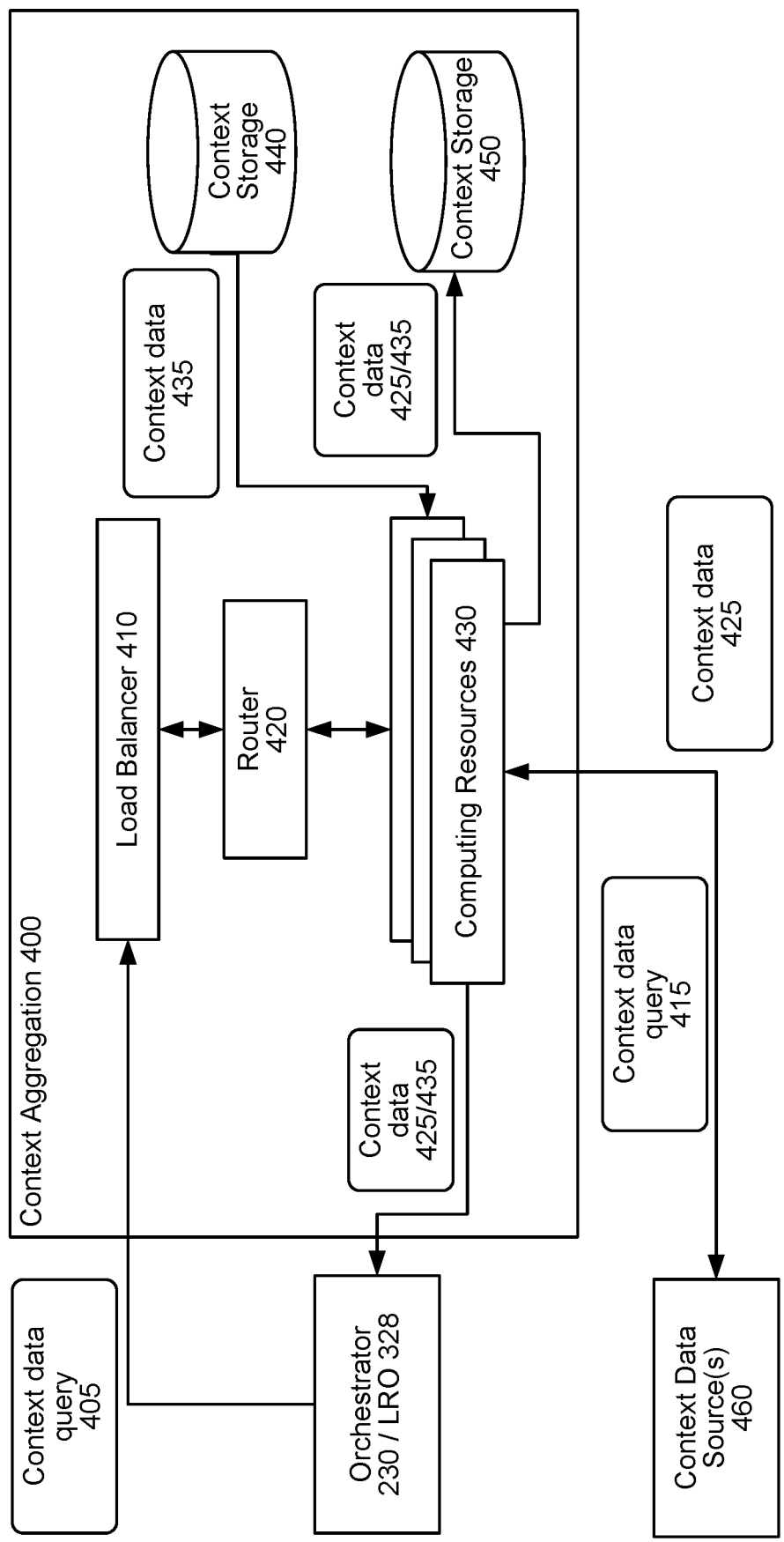
FIG. 4 is a conceptual diagram illustrating components for aggregating context data in response to a query for context data, according to embodiments of the present disclosure.

The speech processing system 120/speech controllable device 110 may include a context aggregation component 400 that aggregates context data from various sources. FIG. 4 illustrates how the context aggregation component 400 may process a context data query 405 requesting context data corresponding to a particular natural language input. The context data query 405 may be sent to a load balancer 410. The load balancer 410 may assign the context data query 405 to one or more computing resources 430 based on a present load of the computing resources 430.

The context aggregation component 400 may receive multiple context data queries associated with the same natural language input. Moreover, more than one of these context data queries may be received by the context aggregation component 400 between a time when one or more computing resources 430 are called to process with respect to one of the context data queries and when the one or more computing resources 430 outputs the requested context data. The context aggregation component 400 may include a router 420 that acts as a secondary load balancer to the load balancer 410. That is, the router 420 may determine one or more computing resources 430 are currently processing to aggregate context data associated with the natural language input associated with the context data query 405. If none of the computing resources 430 are currently processing as such, the router 420 may let the load balancer 410's assignment stand. Conversely, if the router 420 determines one or more computing resources 430 are currently aggregating the requested context data, the router 420 may reassign the context data query 405 to those one or more computing resources 430. The foregoing decisions of the router 420 may be based on job statuses associated with processes performed by one or more computing resources 430. This prevents the computing resources 430 from duplicating queries to the same context data source(s) 460, for the same context data (e.g., thereby decreasing load on downstream context data sources). Moreover, as a result of such reassignment, the computing resources 430 are able to output context data, in response to multiple context data queries, even if processing for one context data query began prior to receipt of a second context data query requesting the same context data. As a result, context data may be provided to the source of the second context data query faster than if the computing resources 430 separately called one or more context data sources 460 in response to the second context data query.

The computing resources 430 may be associated with a preconfigured data framework of entities and relationships (or may have a plurality of preconfigured data frameworks). The data framework may be generated offline, and used by the computing resources 430 at runtime. For example, a data framework may represent a user device 110 is associated with a user 5. The user 5 may be associated with one or more endpoint devices. The user 5 may also be associated with a group that includes various users. A data framework may also include nodes representing substance of the natural language input.

The one or more computing resources 430 (either determined by the load balancer 410 or the router 420) may use an entity or natural language input parameter (represented in the context data query 405) as a starting point to traverse the data framework to determine different types of related entities. For example, if the context data query 405 requests data associated with a particular user identifier, the one or more computing resources 430 may determine one or more endpoint device identifiers associated with the user identifier, a group identifier associated with the user identifier, and/or one or more other user identifiers associated the group identifier.

The one or more computing resources 430 may determine, for each entity, at least one context data source 460. The context data source(s) 460 may have access to various types of context data including, for example, data representing which users of the speech processing system 120/speech controllable device 110 are subscribed to one or more pay-for services of the speech processing system 120/speech controllable device 110, data representing IP addresses associated with user devices from which natural language inputs were received, data representing electronic calendar events, data representing types of music a particular user 5 has listened to over a previous amount of time (e.g., the last 30 days), data representing demographic information of users (e.g., birthdate, gender, education, etc. as represented in user profiles) etc. In general, the context data source(s) 460 may provide context data that may be used by various components of the speech processing system 120/speech controllable device 110 in performing their respective processes. A context data source 460 may be a storage containing context data, or may be a computer processing component in communication with such a storage. A context data source 460 may be implemented by the speech processing system 120/speech controllable device 110, or may be implemented separate from but in communication with the speech processing system 120/speech controllable device 110.

The one or more computing resources 430 may send a context data query 415 to each determined context data source 460. The context data query 415, sent to a particular context data source 460, may represent one or more entity identifiers for each of the one or more entity types determined while traversing the data framework. The identifiers may correspond to one or more device identifiers, one or more user identifiers, one or more natural language input identifiers, etc. The one or more computing resources 430 may receive context data 425 from each queried context data source 460.

The one or more computing resources 430 may also query context storage 440 for context data 435 prefetched with respect to the natural language input, user 5, and/or user device 110 (e.g., queried from context data sources 460 once the system determined the user identifier and/or user device identifier of the user 5 and/or user device 110, respectively, but prior to a component of the speech processing system 120/speech controllable device 110 needing such context data to process). The one or more computing resources 430 may query context storage 440 with respect to the same identifier(s) that the one or more computing resources send to the context data source(s) 460.

The one or more computing resources 430 may store the context data (425/435) in context storage 450. The context data stored in context storage 450 may represent a source (e.g., a context data source 460) from which the context data was received, one or more identifiers of the one or more computing resources 430 used to obtain the context data, a type of the context data, etc.

The one or more computing resources 430 may also send the context data (425/435) to the component(s) of the speech processing system 120/speech controllable device 110 that originated context data queries requesting the context data. In some examples, the one or more computing resources 430 may send the context data (425/435) to the orchestrator component 230/LRO 328, which may route the context data (425/435) to the speech processing system 120/speech controllable device 110 component(s) that requested the context data. The context data (425/435) may be sent to the speech processing system 120/speech controllable device 110 component that originated the context data query 405. The context data (425/435) may also be sent to one or more system 120/speech controllable device 110 components that sent context data queries (requesting the same or similar context data as the context data query 405) after the context data query 405 was received, but prior to the context data (425/435) being received by the context aggregation component 400 (e.g., context data queries reassigned by the router 420).

The aggregation of context data, as described with respect to FIG. 4, may occur more than once with respect to a single natural language input. For example, the context aggregation component 400 may receive a first query for context data to be used to perform ASR processing with respect to a natural language input, a second query for context data to be used to perform NLU processing with respect to the natural language input, a third query for context data to be used to select a skill system 125 to be invoked with respect to the natural language input, a fourth query for context data to be used by the skill system 125 to perform an action responsive to the natural language input, etc. For further example, the context aggregation component 400 may receive a first query for context data to be used to perform NLU processing of a natural language input by a first NLU domain, a second query for context data to be used to perform NLU processing of the natural language input by a second NLU domain, etc.

In at least some examples, the context aggregation component 400 may associate received context data with a corresponding natural language input identifier for later recall. For example, when the context aggregation component 400 prefetches context data to be used for ASR processing, the context aggregation component 400 may associate the context data with a corresponding natural language input identifier in storage. Thereafter, if the ASR component 250 requests context data for the natural language input identifier, the context aggregation component 400 is able to recall the appropriate context data (e.g., the context data associated with the natural language input identifier) from storage. For further example, when the context aggregation component 400 prefetches context data to be used for NLU processing, the context aggregation component 400 may associate the context data with a corresponding natural language input identifier in storage. Thereafter, if the NLU component 260 requests context data for the natural language input identifier, the context aggregation component 400 is able to recall the appropriate context data from storage. Other examples are possible.

The context aggregation component 400 may receive queries for context data for different natural language inputs and for different stages of natural language input processing. The context aggregation component 400 may also receive published events, such as those representing a user has recently enabled a skill system 125. The context aggregation component 400 may obtain context data when the context aggregation component 400 anticipates context data may be used during processing of a natural language input. For example, in response to receiving a published event representing a user has recently enabled a skill system 125, the context aggregation component 400 may obtain context data that may be used by the skill system 125 to process a natural language input provided by the user.

Figure 5A:
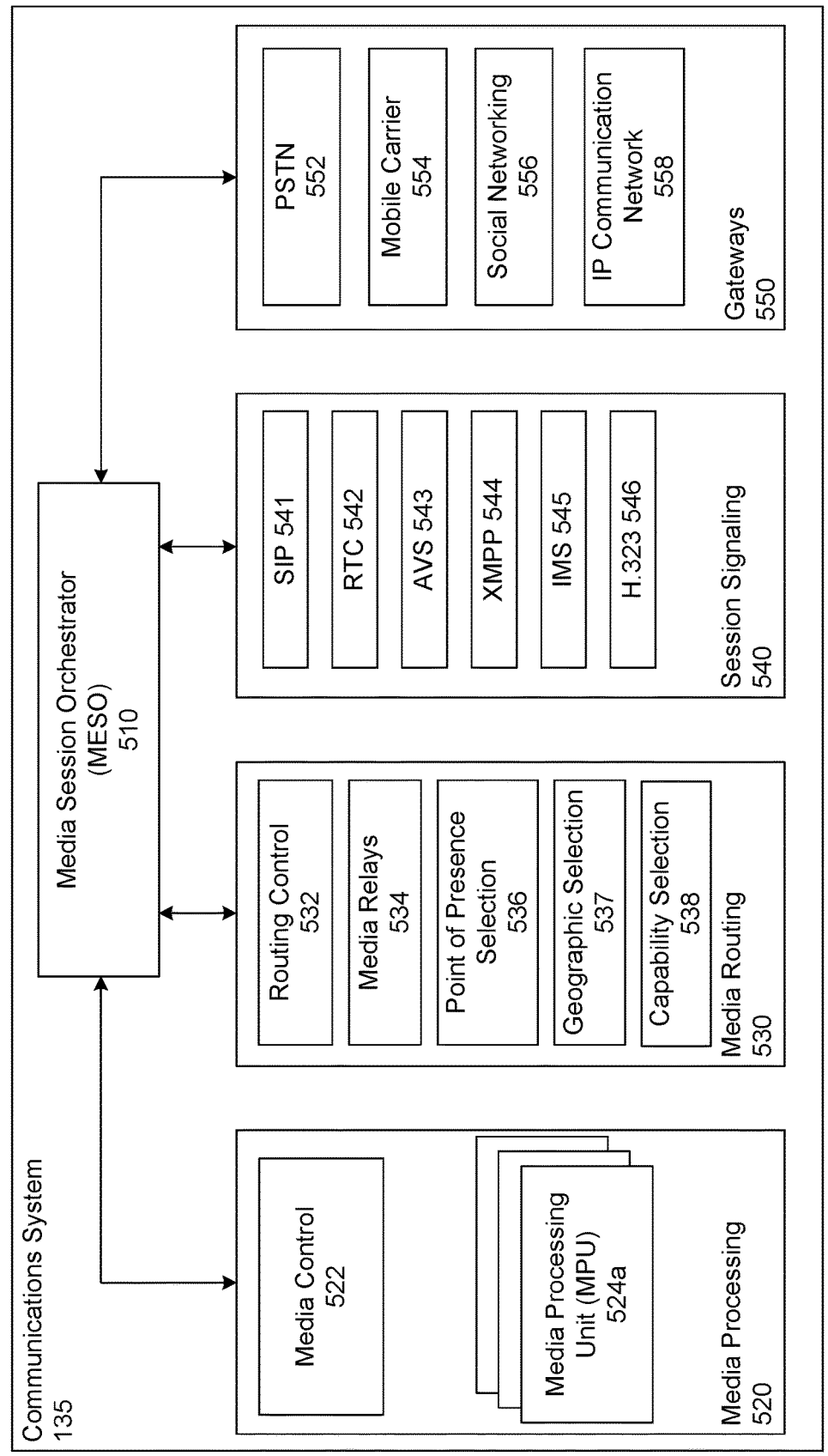
FIGS. 5A-5B are example component diagrams of a communications system, according to embodiments of the present disclosure.
Figure 5B:
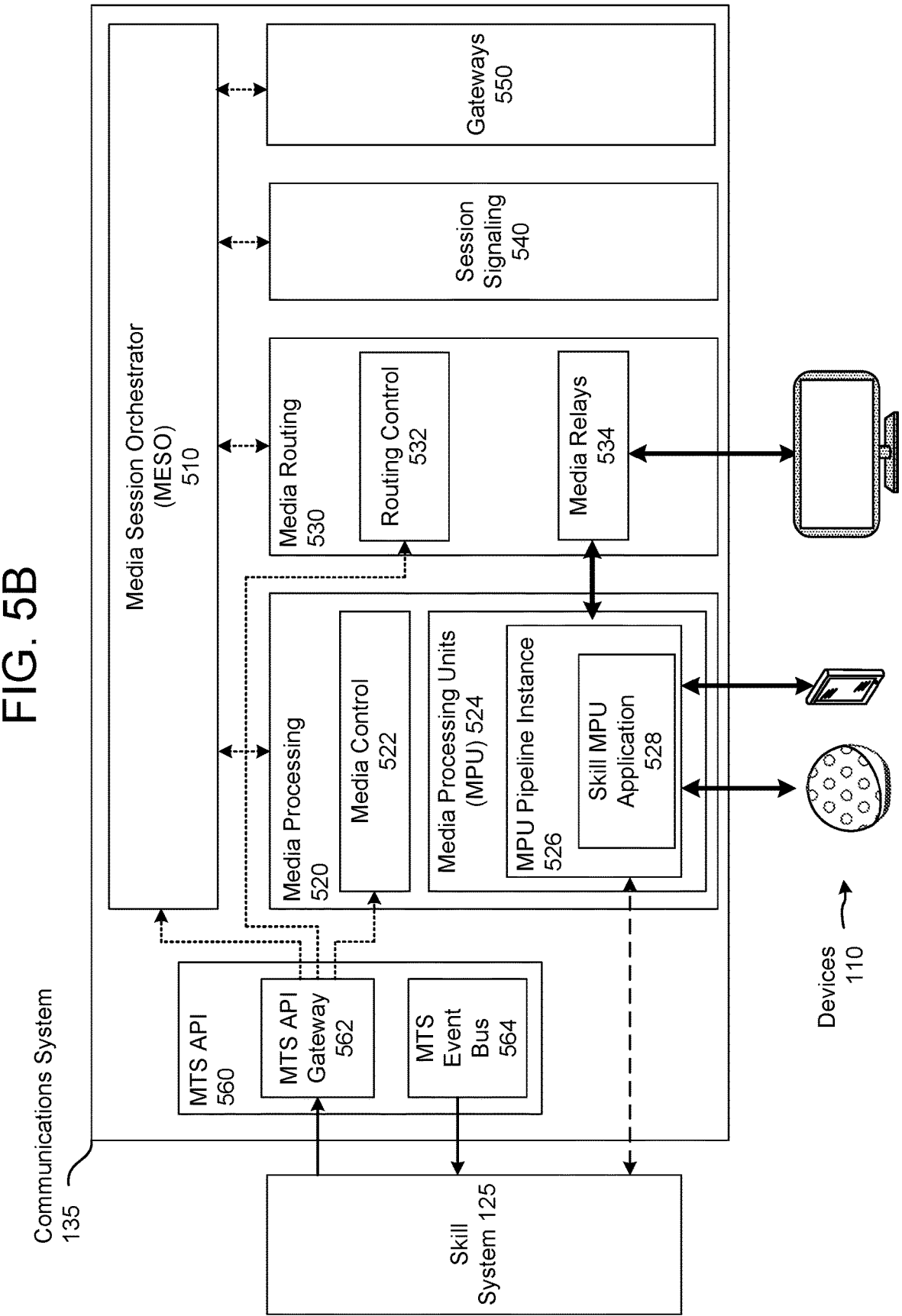

FIGS. 5A-5B are example component diagrams of the communications system 135. A skill system 125 may interact with the communications system 135 to request and use resources available within the communications system 135. To enable such, the communications system 135 may include a media session orchestrator (MESO) component 510 configured to coordinate (e.g., define, establish, manage, etc.) a communication session (e.g., media session).

As illustrated in FIG. 5A, the MESO component 510 may interface between components that fall within four distinct categories: media processing components 520, media routing components 530, session signaling components 540, and/or gateway components 550.

Media processing components 520 refers to processing media content to enable unique functionality. For example, the communications system 135 may provide a hosted back-end that performs media processing on individual streams of data, enabling the skill system 125 to define and control how media content is processed by the communications system 135. The media processing components 520 may correspond to real time processing (e.g., data is processed during run-time, such as while streaming video, during a videoconference, and/or the like) or offline processing (e.g., data is processed and stored in a database for future requests, such as during batch processing) without departing from the disclosure.

The communications components 520 may include a media control component 522 and/or at least one media processing unit (MPU) 524 (e.g., a first MPU 524a, a second MPU 524b, etc.). The media control component 522 may coordinate media processing by sending control data to and/or receiving control data from other components within the communications system 135. For example, the MESO component 510 may send a request to the media control component 522 to launch a specific application (e.g., skill system 125, process, etc.) to perform media processing and the media control component 522 may send an instruction to a corresponding MPU 524.

The MPU 524 may be configured to perform media processing to enable additional functionality. Thus, the MPU 524 may receive first data and process the first data to generate second data. As part of performing media processing, the MPU 524 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 524 may generate subtitles (e.g., text data) corresponding to speech represented in image data, may translate the subtitles to a different language, may perform TTS processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the communications system 135 may perform media processing using two or more MPUs 524. For example, the communications system 135 may perform first media processing using a first MPU 524a, second media processing using a second MPU 524b, etc. To illustrate an example, a communication session may correspond to a video chat implementation that includes image data and audio data and the communications system 135 may perform media processing in parallel. For example, the communications system 135 may separate the image data and the audio data, performing first media processing on the image data and separately performing second media processing on the audio data, before combining the processed image data and the processed audio data to generate output data. However, the disclosure is not limited thereto, and in other examples the communications system 135 may perform media processing in series without departing from the disclosure. For example, the communications system 135 may process first image data using the first MPU 524a (e.g., first media processing) to generate second image data and may process the second image data using the second MPU 524b (e.g., second media processing) to generate output image data. Additionally or alternatively, the communications system 135 may perform multiple media processing steps using a single MPU 524 (e.g., more complex media processing) without departing from the disclosure.

The communications system 135 may include media routing components 530 that are configured to route media (e.g., send data packets) to and from a device(s) 110 via the network(s) 199. For example, the media routing components 530 may include a routing control component 532, a media relay component 534, a point of presence selection component 536, a geographic selection component 537, and/or a capability selection component 538. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 5A illustrates the media routing components 530 including the point of presence selection component 536, geographic selection component 537, and/or capability selection component 538 as separate components, this is for ease of illustration and the disclosure is not limited thereto. Instead, a single component may perform point of presence selection, geographic selection, and/or capability selection without departing from the disclosure.

In some examples, the communications system 135 may separate the MPUs 524 from the network(s) 199 so that the MPUs 524 do not have a publicly accessible internet protocol (IP) address (e.g., cannot route outside of a local network). Thus, the communications system 135 may use the media relay components 534 to send the first data from a first device to the MPUs 524 and/or the second data (e.g., processed data) generated by the MPUs 524 from the MPUs 524 to a second device. For example, an individual device 110 may be associated with a specific TURN server, such that the communications system 135 may route data to and from the first device using a first TURN server and route data to and from the second device using a second TURN server.

While the example described above illustrates routing data to and from the media processing components 520, the media routing components 530 may be used to route data separately from the media processing components 520 without departing from the disclosure. For example, the communications system 135 may route data directly between devices 110 using one or more TURN servers (e.g., TURN system) without departing from the disclosure. Additionally or alternatively, the communications system 135 may route data using one or more STUN servers (e.g., STUN system), such as when a device 110 has a publicly accessible IP address. In some examples, the communications system 135 may establish communication sessions using a combination of the STUN system and the TURN system without departing from the disclosure. For example, a communication session may be more easily established/configured using the TURN system, but may benefit from latency improvements using the STUN system. Thus, the communications system 135 may route data using the STUN system, the TURN system, and/or a combination thereof without departing from the disclosure.

In addition to routing data, the media routing components 530 may also perform topology optimization. For example, the media routing components 530 may include geographically distributed media relay components (e.g., TURN/STUN servers) to enable the communications system 135 to efficiently route the data packets. For example, the media routing components 530 may include a control plane that coordinates between the media relay components to select an optimum route (e.g., data path) to send the data packets. To illustrate an example, the media routing components 530 may determine a location of parties in a communication session and determine a data path that bypasses a particular country or chokepoint in the data network. In some examples, the media routing components 530 may select an enterprise specific route and only use specific connected links associated with the enterprise. Additionally or alternatively, the routing components 530 may apply machine learning models to further reduce latency by selecting the optimum route using non-geographical parameters (e.g., availability of servers, time of day, previous history, etc.).

While the description of the media relay components 534 refers to the STUN system and/or the TURN system, the disclosure is not limited thereto. Instead, the media routing components 530 may use any alternative systems known to one of skill in the art to route the data packets. For example, the media routing components 530 may use any technique that routes UDP data packets and allows the UDP data packets to traverse the NATs without departing from the disclosure. To illustrate an example, the media routing components 530 may include UDP packet forwarding and relay devices instead of the TURN system without departing from the disclosure.

The communications system 135 may include session signaling components 540 (e.g., edge signaling, signaling network, etc.) that may be configured to coordinate signal paths (e.g., routing of data packets) and/or a type of data packets sent between devices 110 and one or more servers within the communications system 135. For example, the session signaling components 540 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 5A, the session signaling components 540 may support protocols including Session Initiation Protocol (SIP) 541, Real-Time Communication (RTC) protocol 542 (e.g., WebRTC protocol), Alexa Voice Service (AVS) protocol 543 or other voice user interface protocols, Extensible Messaging and Presence Protocol (XMPP) 544, IP Multimedia Core Network Subsystem (IMS) 545, H.323 standard 546, and/or the like, although the disclosure is not limited thereto.

The communications system 135 may include gateway components 550 that enable the communications system 135 to interface with (e.g., send/receive media content or other data) external networks. As illustrated in FIG. 5A, the gateway components 550 may include a public switched telephone network (PSTN) gateway 552, a mobile carrier gateway 554, a social networking gateway 556, an IP communication network gateway 558, and/or other gateways known to one of skill in the art. While FIG. 5A illustrates the gateway components 550 including a single gateway for each external network, this is intended for illustrative purposes only and the gateway components 550 may include multiple gateways for an external network without departing from the disclosure. For example, the gateway components 550 may include multiple PSTN gateways 552 having different locations without departing from the disclosure. Additionally or alternatively, a single type of external network may correspond to multiple external networks without departing from the disclosure. For example, the gateway components 550 may include a first mobile carrier gateway 554a corresponding to a first mobile carrier network and a second mobile carrier gateway 554b corresponding to a second mobile carrier network without departing from the disclosure. However, the disclosure is not limited thereto and two or more mobile carrier networks may share a mobile carrier gateway 554 without departing from the disclosure.

To illustrate an example of using the gateway components 550, the communications system 135 may use the PSTN gateway 552 to establish a communication session with a PSTN device (e.g., wired/wireless telephone, cellular phone, and/or the like that is associated with a PSTN telephone number) using the PSTN. For example, the communications system 135 may use the session signaling components 540 to send SIP data packets from a device 110 to a PSTN gateway 552. The PSTN gateway 552 may receive the SIP data packets, convert the SIP data packets to audio data in a different format, and send the audio data to the PSTN device via the PSTN. Thus, the gateway components 550 may include a plurality of gateways, with each gateway being associated with a specific external network and configured to act as an interface between the communications system 135 and the external network.

FIG. 5B illustrates an example of signal paths and data flow between components within the communications system 135. As illustrated in FIG. 5B, a skill system 125 may send data to a media transport system (MTS) application programming interface (API) 560 of the communications system 135. The MTS API 560 may include an MTS API gateway component 562 that receives the data (e.g., request) and sends data to the MESO component 510, the media processing components 520, the media routing components 530, and/or other components. For example, FIG. 5B illustrates the MTS API gateway component 562 communicating with the MESO component 510, the media control component 522, and the routing control component 532.

As described above with regard to FIG. 5A, the MESO component 510 may communicate with the media processing components 520, the media routing components 530, the session signaling components 540, and/or the gateway components 550. Internal signaling within the communications system 135 is represented in FIG. 5B as dotted lines.

The components within the communications system 135 may process the request received from the MTS API gateway 562 and send data to the MTS API 560 in response to processing the request. For example, components within the communications system 135 may send data to an MTS event bus 564 of the MTS API 560 and the MTS event bus 564 may send data (e.g., event, notification, etc.) to the skill system 125. Data sent as part of the MTS interface between the skill system 125 and the communications system 135 is represented in FIG. 5B using a solid line.

As illustrated in FIG. 5B, the skill system 125 may communicate with the MPU 524. For example, the skill system 125 may communicate with an MPU pipeline instance 526 running within the MPU 524 that includes a skill MPU application 528. Thus, the skill system 125 may communicate directly with the skill MPU application as part of an application interface, which is represented as a dashed line in FIG. 5B. In addition to communicating with the skill system 125, the MPU pipeline instance 526 may send data (e.g., media content) to devices 110, either directly or via the media relay components 534.

As used herein, a MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the communications system 135 may use the MESO component 510 to route triggers and events directly to the MPU pipeline instance that is performing the media processing, enabling the communications system 135 to perform media processing in real-time.

Using the MESO component 510, the communications system 135 allows skill systems 125 and/or applications to enable unique functionality without requiring the skill system/application to independently develop and/or program the functionality. Thus, the communications system 135 may offer media processing operations as a service to existing skill systems/applications. For example, the communications system 135 may enable a skill system to provide closed captioning or other features without building a closed captioning service. Instead, the communications system 135 may route a communication session through an MPU 524 configured to perform closed captioning. Thus, a MPU 524 configured to enable a specific feature may be used to enable the feature on multiple skill systems without departing from the disclosure.

As the MESO component 510 is capable of executing requests and commands with low latency, the communications system 135 may use multiple components within a single communication session. For example, the communications system 135 may combine multiple different components (e.g., MPUs 524 associated with one or more skill systems 125) to piece together a custom implementation enabling a combination of existing features. To illustrate an example, the communications system 135 may build a back-to-back SIP user engine that is customizable for a specific implementation. Thus, the MESO component 510 may mix and match different components and/or features to provide a customized experience.

Figure 6A:
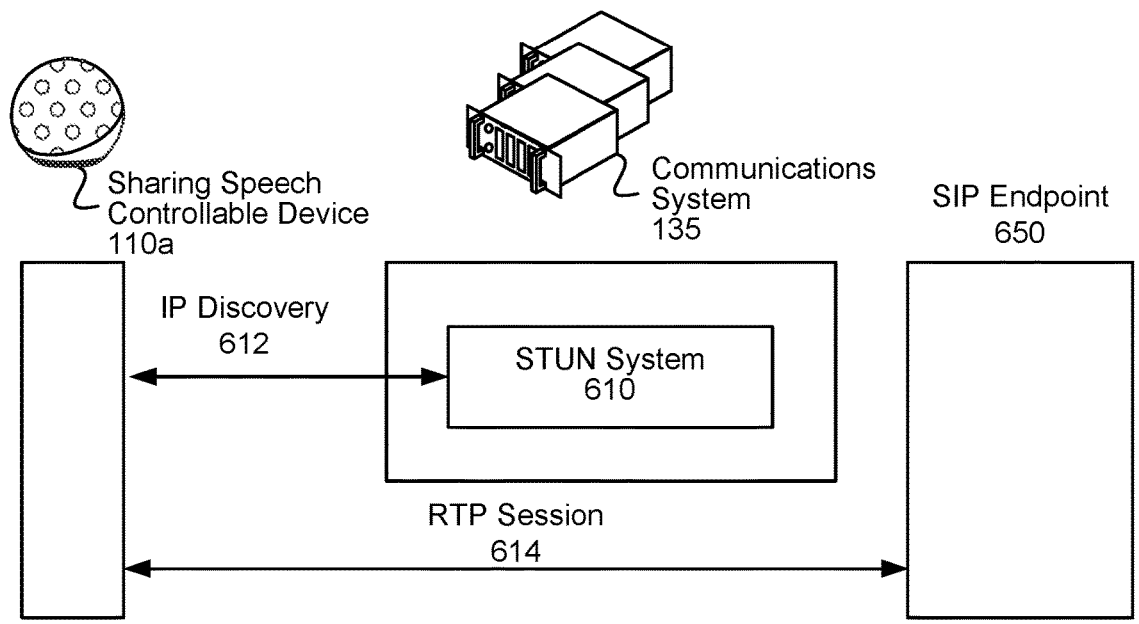
FIGS. 6A-6B illustrate examples of establishing communications connections between devices, according to embodiments of the present disclosure.
Figure 6B:
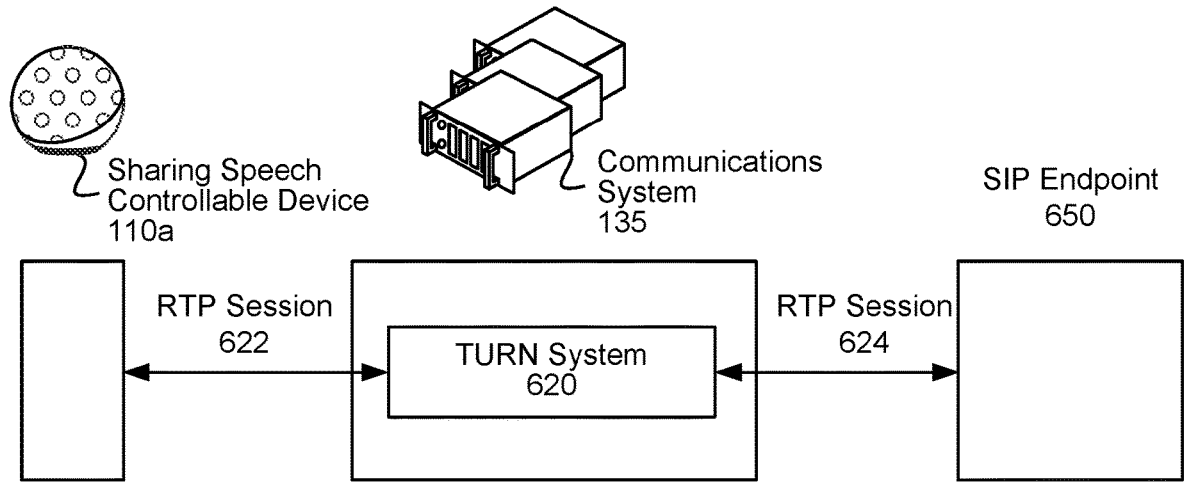

FIGS. 6A-6B illustrate examples of establishing media connections between devices according to embodiments of the present disclosure. In some examples, the sharing speech controllable device 110a may have a publicly accessible IP address and may be configured to establish a real-time transport (RTP) protocol communication session directly with a SIP endpoint 650. The SIP endpoint 650 may be the recipient device 110b, a component within the communications system 135, a gateway component configured to interface with a remote network, and/or a device associated with the remote network itself. To enable the sharing speech controllable device 110a to establish the RTP communication session, the communications system 135 may include Session Traversal of User Datagram Protocol (UDP)

Through Network Address Translators (NATs) system (e.g., STUN system 610). The STUN system 610 may be configured to allow NAT clients (e.g., the sharing speech controllable device 110a behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 6A, the sharing speech controllable device 110a may perform (612) IP discovery using the STUN system 610 and may use this information to set up an RTP communication session 614 (e.g., UDP communication) between the sharing speech controllable device 110a and the SIP endpoint 650 to establish a call.

In some examples, the sharing speech controllable device 110a may not have a publicly accessible IP address. For example, in some types of NAT the sharing speech controllable device 110a cannot route outside of the local network. To enable the sharing speech controllable device 110a to establish an RTP communication session, the communications system 135 may include Traversal Using relays around NAT (TURN) system 620. The TURN system 620 may be configured to connect the sharing speech controllable device 110a to the SIP endpoint 650 when the sharing speech controllable device 110a is behind a NAT. As illustrated in FIG. 6B, the sharing speech controllable device 110a may establish (622) an RTP session with the TURN system 620 and the TURN system 620 may establish (624) an RTP session with the SIP endpoint 650. Thus, the sharing speech controllable device 110a may communicate with the SIP endpoint 650 via the TURN system 620. For example, the sharing speech controllable device 110a may send audio data and/or image data to the communications system 135 and the communications system 135 may send the audio data and/or the image data to the SIP endpoint 650. Similarly, the SIP endpoint 650 may send audio data and/or image data to the communications system 135 and the communications system 135 may send the audio data and/or the image data to the sharing speech controllable device 110a.

In some examples, the communications system 135 may establish communication sessions using a combination of the STUN system 610 and the TURN system 620 without departing from the disclosure. For example, a communication session may be more easily established/configured using the TURN system 620, but may benefit from latency improvements using the STUN system 610. Thus, the communications system 135 may use the STUN system 610 when the communication session may be routed directly between two devices and may use the TURN system 620 for all other communication sessions. Additionally or alternatively, the communications system 135 may use the STUN system 610 and/or the TURN system 620 selectively based on the communication session being established. For example, the communications system 135 may use the STUN system 610 when establishing a communication session between two devices (e.g., point-to-point) within a single network (e.g., corporate LAN and/or WLAN), but may use the TURN system 620 when establishing a communication session between two devices on separate networks and/or three or more devices regardless of network(s).

When the communication session goes from only two devices to three or more devices, the communications system 135 may need to transition from the STUN system 610 to the TURN system 620. Thus, if the communications system 135 anticipates three or more devices being included in the communication session, the communication session may be performed using the TURN system 620. Similarly, when the communication session goes from three or more devices to only two devices, the communications system 135 may need to transition from the TURN system 620 to the STUN system 610.

While FIGS. 6A-6B illustrate an RTP communication session being established between the sharing speech controllable device 110a and the SIP endpoint 650, the present disclosure is not limited thereto and the RTP communication session may be established between the sharing speech controllable device 110a and a gateway component or other device associated with the SIP endpoint 650 without departing from the present disclosure. Additionally or alternatively, while FIGS. 6A-6B illustrate examples of enabling communication sessions using the SIP protocol, the disclosure is not limited thereto and the communications system 135 may use any protocols known to one of skill in the art.

While FIGS. 6A-6B illustrate examples of enabling communication sessions using a data connection (e.g., using Voice over Internet Protocol (VoIP), session initiation protocol (SIP), and/or the like), the disclosure is not limited thereto and the communications system 135 may enable communication sessions using any type of network without departing from the disclosure. For example, the communications system 135 may enable communication sessions using a cellular connection (e.g., mobile phone network) or other external network without departing from the disclosure. For example, the communications system 135 may send instructions (e.g., command data) to endpoints (e.g., caller devices, such as the device 110) instructing the endpoint to establish a communication session (e.g., dial a telephone number) in response to the voice command.

Figure 7:
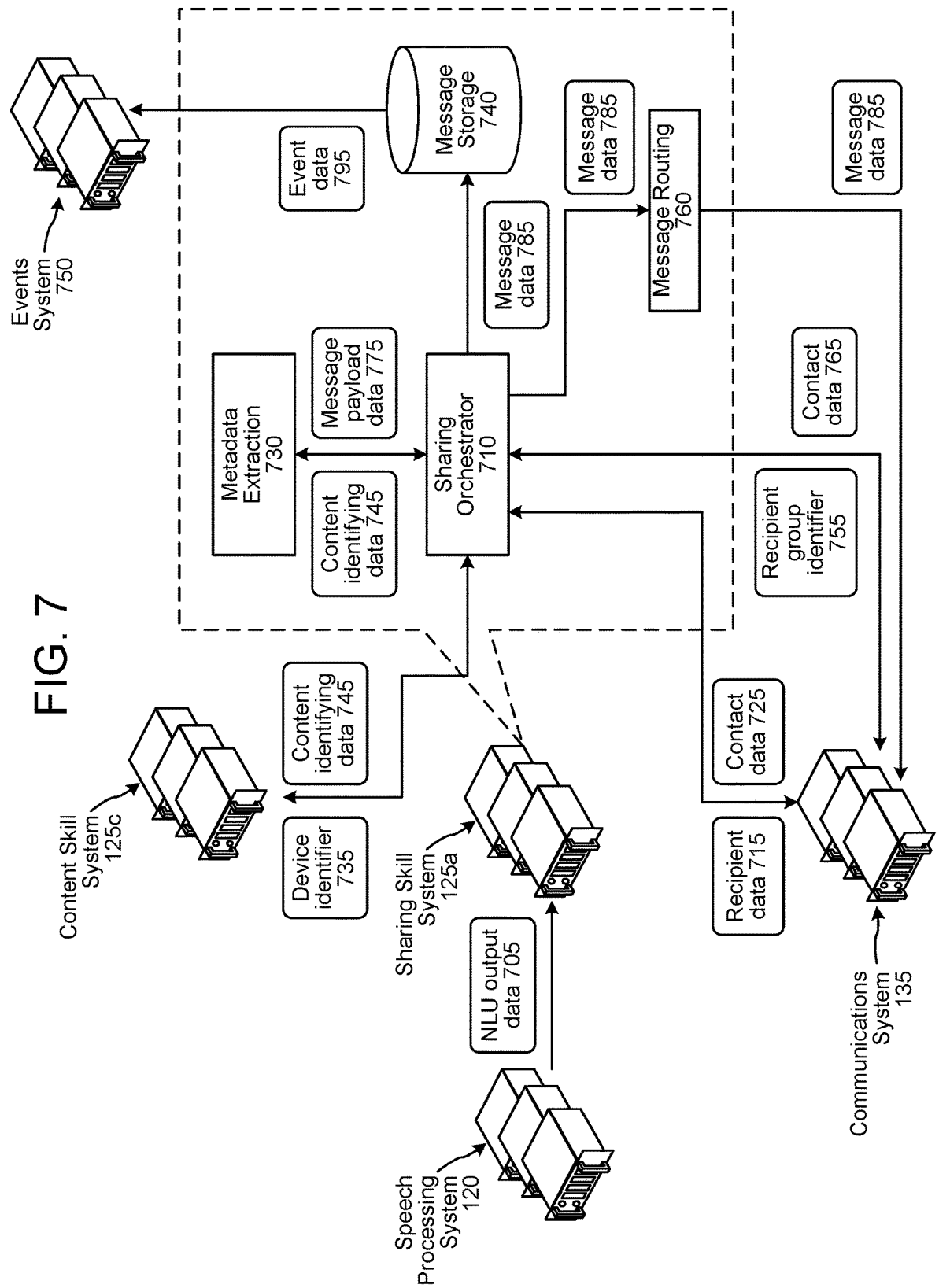
FIG. 7 is a conceptual diagram of systems and components for sharing content using a VUI, according to embodiments of the present disclosure.

FIG. 7 conceptually illustrates systems and components for sharing content using a VUI. The speech processing system 120 may generate NLU output data 705 including a <ShareContent>, <Share>, or other like intent representing the sharing user 5 wants to send content to one or more recipient users. When the speech processing system 120 generates such NLU output data 705, the speech processing system 120 may send the NLU output data 705 to a sharing skill system 125a.

Generally, the sharing skill system 125a is configured to process the NLU output data 705 to determine a type of content to be shared, determine recipient information in the NLU output data 705, and coordinate with various other skill systems 125 to gather information for generating a message to share the content. The sharing skill system 125a may process the NLU output data 705 to determine tagged recipient information therein. During NER processing, the NLU component 260/360 may tag a recipient name(s) in ASR output data input to the NLU component 260/360. For example, for the spoken user input "send this song to Bob," the NLU output data 705 may include a portion such as "Recipient: Bob." For further example, for the spoken user input "send this photo to Rob and Jane," the NLU output data 705 may include a portion such as "Recipients: Rob, Jane." The sharing skill system 125a may include a sharing orchestrator component 710 that sends, to a recipient resolution skill system 125b, recipient data 715 including the recipient name(s) represented in the NLU output data 705.

The recipient resolution skill system 125b is configured to resolve the recipient data 715 to one or more contacts in a contact list associated with or represented in a user profile of the sharing user 5. In other words, the recipient resolution skill system 125b is configured to determine with who the sharing user 5 wants to share content with.

The recipient resolution skill system 125b may determine contact list data associated with a user profile identifier of the sharing user 5 (and/or device profile identifier of the sharing speech controllable device 110a). The recipient resolution skill system 125b may determine whether a recipient name, in the recipient data 715, corresponds to a single contact name in the contact list data. For example, if the recipient name is "Bob Smith," the recipient resolution skill system 125b may determine whether the words "Bob Smith" are represented in the "name" field of one or more contacts in the contact list data. For further example, if the recipient name is "Jane," the recipient resolution skill system 125b may determine whether the word "Jane" is represented in the "name" field of one or more contacts in the contact list data.

In some instances, the sharing user 5 may speak the name of a recipient group including two or more individual recipients. For example, the sharing user 5 may speak "share this recipe with my family," where "family" is meant to refer to various users corresponding to the sharing user's family. For further example, the sharing user 5 may speak "share this meeting invite with my team," where "team" is meant to refer to various users corresponding to the sharing user's coworkers. In another example, the sharing user 5 may speak "share this photo with my friends," where "friends" is meant to refer to various users corresponding to the user's friends. In such examples, the recipient resolution skill system 125b may determine whether the word "family," "colleagues," or "friends" is represented in the name field of one or more contacts in the contact list data.

If the recipient resolution skill system 125b determines the recipient name corresponds to a single contact name, the recipient resolution skill system 125b may determine contact data corresponding to the single contact name. The contact data may include, for example, the contact name, a phone number associated with the contact name, an email associated with the contact name, a social media handle associated with the contact name, a messaging identifier corresponding to messaging functionality provided by the speech processing system 120, etc.

Instead, if the recipient resolution skill system 125b determines the recipient name corresponds to more than one contact name in the contact list data, the recipient resolution skill system 125b may perform disambiguation processing to determine a single contact name. As part of disambiguation processing, the recipient resolution skill system 125b may generate disambiguation data indicating the multiple contact names the recipient resolution skill system 125b has determined the recipient name corresponds to, and including a request that the sharing user 5 indicates which of the contact names is correct. For example, if the recipient name is Joe, the recipient resolution skill system 125b may generate data including the natural language "You said Joe. Did you mean Joe Smith or Joe Doe?"

The recipient resolution skill system 125b may cause the sharing speech controllable device 110a to display natural language text corresponding to the disambiguation data. The recipient resolution skill system 125b may also or alternatively cause the sharing speech controllable device 110a to display a first button corresponding to a first contact (e.g., including the natural language text "Joe Smith") and a second button corresponding to a second contact (e.g., including the natural language text "Joe Doe"). The recipient resolution skill system 125b may also or alternatively send the data to the TTS component 280/380; thereafter receive, from the TTS component 280/380, output audio data including synthesized speech corresponding to the disambiguation data; and may thereafter cause the output audio data to be sent to the sharing speech controllable device 110a to output the synthesized speech.

The sharing user 5 may indicate the correct recipient name in various ways. For example, the sharing user 5 may select a displayed button including natural language text corresponding to the correct recipient name. In response, the sharing speech controllable device 110a may cause input data, indicating the selection, to be sent to the recipient resolution skill system 125b. For further example, the sharing user 5 may speak the correct recipient name. When this occurs, the ASR component 250/350 or the SLU component 255/355 may process audio data representing the speech to generate text data or token data representing the spoken recipient name, and the text data or token data may be sent to the recipient resolution skill system 125b.

In at least some embodiments, the recipient resolution skill system 125b may perform disambiguation processing using usage data. The recipient resolution skill system 125b may determine usage data associated with the user profile identifier of the sharing user 5 (and/or device profile identifier of the sharing speech controllable device 110a) and stored in the profile storage 270/370. The usage data may represent previous instances where the sharing user 5 shared content with one or more recipient users. The recipient resolution skill system 125b may determine a present/current time of day (when the instant share request is received by the speech processing system 120/sharing speech controllable device 110a), determine one or more past/historic content sharing instances in the usage data associated with the present time of day, determine a single recipient name is associated with all, or most, of the one or more content sharing instances, and determine the recipient name corresponds to that single contact name in the contact list data.

In other instances, the recipient resolution skill system 125b may disambiguate between contact names based on how often the sharing user 5 shares a particular type of content with a particular recipient user. For example, the usage data may indicate that the sharing user 5 frequently shares a first type of content (e.g., music) with a first recipient user, and that the sharing user frequently shares a second type of content (e.g., social media posts) with a second recipient user.

In response to receiving the data indicating the selected button corresponding to the correct contact name, receiving the text data corresponding to the correct contact name, receiving the token data corresponding to the correct contact name, or determining the contact name using the usage data, the recipient resolution skill system 125b may determine contact data corresponding to the single contact name. After determining the contact data for the recipient name, the recipient resolution skill system 125b may determine whether there is another recipient name in the recipient data 715 received from the sharing skill system 125a. If the recipient resolution skill system 125b determines there is another recipient name, the recipient resolution skill system 125b may repeat the foregoing processing with respect to the additional recipient name. The recipient resolution skill system 125b may repeat the foregoing processing until the recipient resolution skill system 125b determines the recipient resolution skill system 125b has determined contact data for each recipient name represented in the recipient data 715 received from the sharing skill system 125a. Upon determining such, the recipient resolution skill system 125b may send the contact data 725 to the sharing orchestrator component 710 of the sharing skill system 125a. For example, the contact data 725 may include first contact data associated with a first recipient name in the recipient data 715, second contact data associated with a second recipient name in the recipient data 715, etc.

The sharing skill system 125a may be configured to selectively request, from content skill systems, content identifying information representing the content the sharing user 5 wants shared. Different content skill systems may be configured to output different types of content. For example, a music skill system may be configured to output songs, a recipe skill system may be configured to output recipes, a photo skill system may be configured to output photos, a video skill system may be configured to output videos, etc.

To determine which content skill system to call, the sharing skill system 125a may determine an intent represented in the NLU output data 705. For example, for a spoken user input including "share this," the NLU output data 705 may include a <Share> intent. For further example, for a spoken user input including "share this song" or "share this music," the NLU output data 705 may include a <ShareMusic> intent. In another example, for a spoken user input including "share this video," the NLU output data 705 may include a <ShareVideo> intent. For further example, for a spoken user input including "share this recipe," the NLU output data 705 may include a <ShareRecipe> intent.

The sharing skill system 125a may determine whether the intent is a general share intent (i.e., a <Share> intent) or a specific share intent (e.g., a <ShareMusic> intent, a <ShareVideo> intent, a <ShareRecipe> intent, etc.). If the sharing skill system 125a determines the intent is a general share intent, the sharing skill system 125a may perform disambiguation processing to determine a specific share intent.

As part of disambiguation processing, the sharing skill system 125a may generate data requesting the sharing user 5 indicate a content type (e.g., music, photos, video, recipe, VoIP link, etc.) to be shared. For example, the sharing skill system 125a may generate data including the natural language "What type of content do you want to share. For example, try saying share this photo, or share this video."

The sharing skill system 125a may cause the sharing speech controllable device 110a to display natural language text corresponding to the data. The sharing skill system 125a may also or alternatively cause the sharing speech controllable device 110a to display buttons corresponding to different content types. For example, a first button including the text "music," a second button including the text "photo," a third button including the text "video," a fourth button including the text "recipe," etc. The sharing skill system 125a may also or alternatively send the data to the TTS component 280/380; thereafter receive, from the TTS component 280/380, output audio data including synthesized speech corresponding to the data; and may thereafter cause the output audio data to be sent to the sharing speech controllable device 110a to output the synthesized speech.

The sharing user 5 may indicate the content type in various ways. For example, the sharing user 5 may select a displayed button including text corresponding to a content type. In response, the sharing speech controllable device 110a may cause data, indicating the selection, to be sent to the sharing skill system 125a. For further example, the sharing user 5 may speak the content type. When this occurs, the ASR component 250/350 or the SLU component 255/355 may process audio data representing the speech to generate text data or token data representing the spoken content type, and the text data or token data may be sent to the sharing skill system 125a.

In at least some embodiments, the sharing skill system 125a may perform disambiguation processing using context data. The sharing skill system 125a cause a context data query 405 to be sent to the context aggregation component 400. The context data query 405 may include a device identifier of the sharing speech controllable device 110a. In response, the sharing skill system 125a may receive context data representing, among other things, content currently being output by the sharing speech controllable device 110a. For example, the context data may represent the sharing speech controllable device 110a is outputting music, displaying a photo, displaying a recipe, etc.

The sharing skill system 125a may determine a specific share intent based on the selected button, the spoken content type, and/or the context data. For example, if the selected button, the spoken content type, and/or the context data correspond to music, the sharing skill system 125a may determine a <ShareMusic> intent. For further example, if the selected button, the spoken content type, and/or the context data correspond to photo, the sharing skill system 125a may determine a <SharePhoto> intent. In another example, if the selected button, the spoken content type, and/or the context data correspond to recipe, the sharing skill system 125a may determine a <ShareRecipe> intent.

After determining the intent in the NLU output data is not a general share intent, or after performing disambiguation processing to determine a specific share intent, the sharing skill system 125a may determine a content skill system 125c capable of output content represented by the specific share intent. For example, the sharing skill system 125a may determine a music skill system when the specific share intent is a <ShareMusic> intent, a recipe skill system when the specific share intent is a <ShareRecipe> intent, a video skill system when the specific share intent is a <ShareVideo> intent, etc. After determining the content skill system 125c, the sharing orchestrator component 710 may send the device identifier 735, of the sharing speech controllable device 110a, to the content skill system 125c.

The content skill system 125c is configured to generate content identifying data 745 representing the content to be shared. To determine the content to be shared, the content skill system 125c may send, to the context aggregation component 400, a context data query 405 associated with the device identifier of the sharing speech controllable device 110a. In response, the content skill system 125c may receive context data associated with the device identifier.

The context data may represent content being output by the sharing speech controllable device 110a. For example, for a music skill system, the context data may represent a song being output. For further example, for a photo skill system, the context data may represent a photo being displayed on a display of or otherwise associated with the sharing speech controllable device 110a. In another example, for a recipe skill system, the context data may represent a recipe being output as synthesized speech and/or being displayed on a display of or otherwise associated with the sharing speech controllable device 110a.

The context data may also or alternatively include the NLU output data 705. As described herein above, NLU output data may include tagged portions corresponding to information such as song name, artist name, recipe title, and/or other entities included in a spoken natural language input. As such, the context data may represent one or more entities corresponding to the content to be shared.

The content skill system 125c may generate content identifying data 745 based on the context data. Generally, the content identifying data 745 may include information such as a thumbnail image corresponding to the content, a name of the content, a description of the content, an identifier of the content (such as an international standard book number (ISBN) or universally unique identifier (UUID)). In at least some embodiments, the content skill system 125c may generate the content identifying data 745 using a template defined by the sharing skill system 125a or some other system 120/sharing speech controllable device 110a component other than the content skill system. In at least some embodiments, the content skill system 125c may generate the content identifying data 745 as a URL that does not have to conform to a format set by another component of the speech processing system 120/sharing speech controllable device 110a. For example, the URL may be an open graph Hypertext Transfer Protocol (HTTP) URL.

In some instances, the content skill system 125c may determine the context data indicates the sharing speech controllable device 110a is outputting audio and displaying an image or video. In such instances, the content skill system 125c may determine the output content corresponding to the content type (e.g., music, recipe, video, photo, VoIP link, etc.) of the content skill system 125c, and may generate the content identifying data 745 to represent the content corresponding to the content type.

The content skill system 125c may send the content identifying data 745 to the sharing orchestrator component 710.

The sharing orchestrator component 710 may send the recipient data 715, send the device identifier 735, receive the contact data 725, and receive the content identifying data 745 in any order.

The sharing orchestrator component 710 may determine whether the contact data 725 includes a recipient group identifier corresponding to two or more recipient users. If the sharing orchestrator component 710 determines the contact data 725 includes a recipient group identifier 755, the sharing orchestrator component 710 may send the recipient group identifier 755 to the communications system 135.

The communications system 135 is configured to determine individual contacts associated with a received recipient group identifier. Thus, in response to receiving the recipient group identifier 755, the communications system 135 may query a storage for contact data 765 corresponding to the two or more individual contacts associated with the recipient group identifier 755. For example, the contact data 765 may include first contact data associated with a first recipient user, second contact data associated with a second recipient user, etc. Each instance of contact data, represented in the contact data 765, may be associated with a contact name and include one or more of, for example, a contact name, a phone number associated with the contact name, an email associated with the contact name, a social media handle associated with the contact name, a messaging identifier corresponding to communications system 135, etc. The communications system 135 may send the contact data 765 to the sharing orchestrator component 710.

The sharing orchestrator component 710 may also determine the type of data in the content identifying data 745. If the sharing orchestrator component 710 determines the content identifying data 745 includes a URL, the sharing orchestrator component 710 may send the content identifying data 745 to a metadata extraction component 730 of the sharing skill system 125a.

The metadata extraction component 730 is configured to generate message payload data 775 based on the URL in the content identifying data 745. The metadata extraction component 730 may process the URL to identify tags in the URL, and format the substance of the URL, based on the tags, into the message payload data 775 conforming to a standard format for outputting messages to recipient users. The metadata extraction component 730 may implement one or more commercially available URL extraction techniques and/or one or more proprietary URL extraction techniques. In an example, the metadata extraction component 730 may process a HTTP URL using an open graph extractor. In some instances, an extraction technique may be specific to the content skill system 125c. For example, a first extraction technique may be used to process content identifying data generated by a music skill system, a second extraction technique may be used to process content identifying data generated by a photo skill system, a third extraction technique may be used to process content identifying data generated by a recipe skill system, etc. It will be appreciated that implementing the metadata extraction component 730 permits the content skill system 125c to generate a URL to include whatever data the content skill system 125c wants to use to identify the content to be shared. In other words, the metadata extraction component 730 minimized or negates a need for the content skill system 125c to identify to be shared content using specific data.

The metadata extraction component 730 may send the message payload data 775 to the sharing orchestrator component 710. The message payload data 775 may include tagged information such as content type, content name, a description of the content, etc. That is, the message payload data 775 may include non-natural language, formatted information that may be used to generate a portion of a natural language message identifying the content to be shared.

The sharing orchestrator component 710 may send the recipient group identifier 755, send the content identifying data 745, receive the contact data 765, and receive the message payload data 775 in any order. After receiving the message payload data 775, and optionally after receiving the contact data 765, the sharing orchestrator component 710 stores message data 785 in a message storage 740. Generally, an entry in the message storage 740 represents a particular sharing user shared particular content with a particular recipient user.

In the situation where the sharing orchestrator component 710 determines the contact data 725 does not include the recipient group identifier 755, upon receiving the message payload data 775, the sharing orchestrator component 710 may store message data 785 including, for each recipient user represented in the contact data 725, a message identifier, the user profile identifier of the sharing user 5, the contact data of the particular recipient user represented in the contact data 725, and the message payload data.

In the situation wherein the sharing orchestrator component 710 determines the contact data 725 includes the recipient group identifier 755, upon receiving the message payload data 775 and the contact data 765, the sharing orchestrator component 710 may store message data 785 including, for each recipient user represented in the contact data 765, a message identifier, the user profile identifier of the sharing user 5, the contact data of the particular recipient user represented in the contact data 765, and the message payload data. Moreover, each recipient user's message data may include the recipient group identifier to with which the recipient user is associated.

The message storage 740 may store associations between message data entries associated with the same shared content. For example, if content is to be shared with two or more recipient users, the message storage 740 may associate the message data entries of the content across the different recipient users.

In some embodiments, the message storage 740 may store a particular message entry in perpetuity. In some other embodiments, the message storage 740 may store a particular message entry for a duration of time (e.g., a week, two weeks, a month, a year, etc.).

In some embodiments, the message storage 740 may store message data, associated with a recipient group identifier, such that a member of the recipient group may view content corresponding to all of the message data associated with the recipient group identifier in the message storage 740. In some other embodiments, the message storage 740 may store message data such that a member of a recipient group is only able to view content shared with the recipient group after the member became a member of the recipient group. The message storage 740 may associate message data with time data (e.g., a timestamp) representing when the message data was stored. Moreover, contact data of a recipient user may include time data (e.g., a timestamp) representing when the recipient user became a member of the recipient group. Using the two instances of time data, the message storage 740 may prevent the recipient user from viewing content that was shared with the recipient group prior to a time represented by the timestamp associated with the recipient user's contact data.

Figure 8:
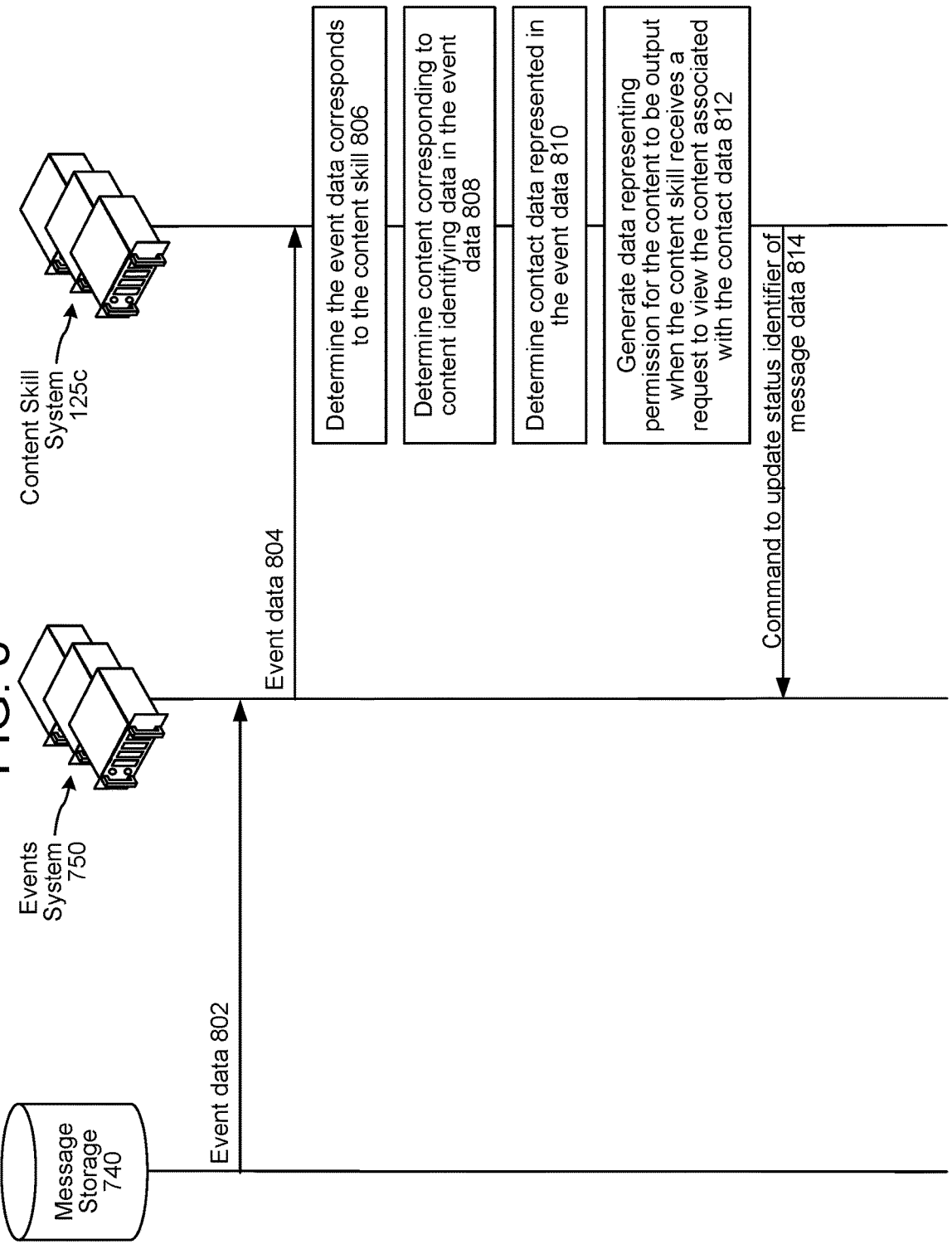
FIG. 8 is a signal flow diagram illustrating how permission to view shared content may be granted by the content skill, according to embodiments of the present disclosure.

Some content skill systems may need to do additional processing once the message data 785 has been stored in the message storage 740. For example, a content skill system may need to provide a recipient user with permission to view to be shared content prior to the recipient user being able to view the content. To this end and as illustrated in FIG. 8, upon the message storage 740 storing the message data 785, the message storage 740 may send (802) event data 795 to an events system 750. Each instance of event data may correspond to a message to be sent to a single recipient user. For example, upon storing the message data 785, the message storage 740 may generate one or more instances of the event data 795, with each instance including the user profile identifier of the sharing user 5, the content identifying data 745, and the contact data of the a particular recipient user.

The events system 750 may send (804) the event data 795 to one or more content skill systems subscribed to receive event data from the events system 750. A content skill system may monitor new events published to the events system 750, and look for events corresponding to the content skill system. For example, a photos skill system may look for events including content identifying data 745 relating to photos, a music skill system may look for events including content identifying data 745 relating to music, a recipe skill system may look for events including content identifying data 745 relating to recipes, etc.

When the content skill system 125c determines (806) the event data 795 corresponds to the content skill system 125c, the content skill system 125c may determine (808) content corresponding to the content identifying data 745 in the event data 795. For example, the content skill system 125c may determine stored content (i.e., audio file, video file, etc.) including metadata corresponding to portions of the content identifying data 745. The content skill system 125c may also determine (810) contact data represented in the event data 795, and generate (812) data representing permission for the content to be output when the content skill system 125c receives a request to view the content associated with the contact data. For example, the content skill system 125c may associate a user identifier, device identifier, email, and/or other information in the contact data with the aforementioned determined content file.

Thereafter, the content skill system 125c may send (814), to the events system 750, a command to update a status identifier of the corresponding message data 785. For example, once the message data 785 is stored in the message storage 740, the message data 785 may be associated with a first status identifier, such as "pending." Upon the content skill system 125c generating the foregoing data granting permission, the content skill system 125c may cause the message data 785, stored in the message storage 740 and associated with the contact data that was provided permission, to be associated with a second status identifier, such as "ready" or "active." In some embodiments, the content skill system 125c may communicate with the message storage 740 directly. In some other embodiments, the content skill system 125c may communicate with the message storage 740 indirectly, for example using the sharing orchestrator component 710 as an intermediary.

Referring again to FIG. 7, upon storing the message data 785 in the message storage 740, and optionally after the content skill system 125c has caused the status identifier of the message data 785 to be updated, the sharing orchestrator component 710 may send the message data 785 to a message routing component 760, which sends the message data 785 to the communications system 135.

The communications system 135 is configured to send the message data 785 to one or more recipient devices associated with the contact data represented in the message data 785. The message data 785, sent to the communications system 135, may correspond to a single instance of shared content to a single recipient user 7. The processing of the communications system 135 described below may be performed separately with respect to multiple different recipient users of a single shared content.

The communications system 135 may determine the contact data, in the message data 785, includes a user profile identifier associated with a single recipient device 110b. In such instances, the communications system 135 may send the message data 785 to the single recipient device 110b. Alternatively, the communications system 135 may determine the contact data, in the message data 785, includes a user profile identifier associated with more than one recipient device 110b. In some instances, the communications system 135 may send the message data 785 to each recipient device 110b associated with the user profile identifier. In some other instances, the communications system 135 may receive data representing one or more of the recipient speech controllable devices 110b is detecting a presence of the recipient user 7 (e.g., by detecting speech of the recipient user 7, detecting presence of the recipient user 7 in an image, etc.), and may selectively send the message data to only the recipient speech controllable device(s) 110b detecting the recipient user 7. In at least some embodiments, the communications system 135 may send audio data, including synthesized speech representing the sharing user 5 and the content being shared, to the recipient speech controllable device(s) 110b.

A recipient device 110b may alert a recipient user of receipt of the message data 785 in various ways. For example, a headless/displayless recipient device 110b may activate a visual element, such as a light, in a particular manner to indicate the recipient device 110b received the message data 785. For further example, a smart phone, tablet, or the like may implement an application associated with the speech processing system 120. Such an application may render the smart phone, tablet, etc. a recipient device 110*b*. An example of such an application is the Amazon Alexa application that may be installed on a smart phone or tablet. In response to such a recipient device 110*b* receiving the message data, the message data may be sent to the application, which may cause the recipient device 110*b* to display a graphical element (e.g., a push notification) representing the recipient user 7 has received a message. Upon the message data being sent to the recipient speech controllable device(s) 110*b*, the message routing component 760 may send event data to the events system 750, with the event data representing the recipient user has been notified of the message.

Figure 9:
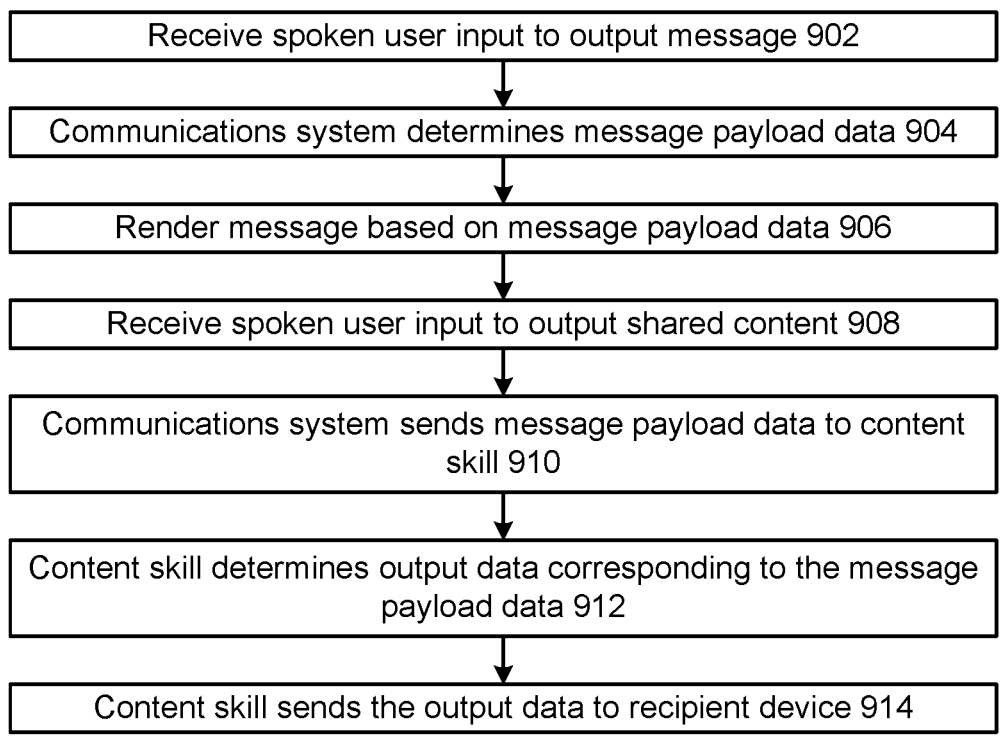
FIG. 9 is a process flow diagram illustrating processing that may be performed in response to a request from a user to output a received message, according to embodiments of the present disclosure.

Referring to FIG. 9, sometime after notifying the recipient user 7 that the recipient user 7 has received a message, the recipient device 110*b* may receive (902) a spoken user input to output the message. The recipient device 110*b*/speech processing system 120 may generate NLU output data representing the spoken user input, and may send the NLU output data to a communications system 135. The communications system 135 may determine (904) the message payload data 775 for the message, and render (906) the message based on the message payload data. The communications system 135 may determine the message payload data 775 by sending a device identifier, of the recipient device 110*b*, to the message routing component 760 (or another component of the sharing skill system 125*a*). In turn, the message routing component 760 (or other component of the sharing skill system 125*a*) may query the message storage 740 for the message payload data 775 associated with the recipient device's identifier.

The communications system 135 may generate text data including natural language text representing the message payload 775, and send the text data to the recipient device 110*b* to display the natural language text. The communications system 135 may also or alternatively send the message payload data 775 to a TTS component; receive, from the TTS component, audio data including synthesized speech representing the message payload data 775; and send the audio data to the recipient device 110*b* to output the synthesized speech. For example, the natural language text and/or synthesized speech may correspond to "Bob has shared a song with you. Do you want to hear it?" For further example, the natural language text and/or synthesized speech may correspond to "Bob has shared a recipe with you. Do you want me to tell you about it?" In at least some embodiments, upon the message being rendered, the communications system 135 may send event data to the events system 750, with the event data representing the recipient user 7 has received the message.

After displaying the natural language text and/or outputting the synthesized speech, the recipient device 110*b* may receive (908) a spoken user input to output the shared content (e.g., play the shared song, display the shared photo, output the shared recipe as synthesized speech and/or displayed content, etc.). The recipient device 110*b*/speech processing system 120 may generate NLU output data representing the spoken user input, and may send the NLU output data to the communications system 135. The communications system 135 may in turn send (910) the message payload data 775 to the content skill system 125*c* that generated the content identifying data 745 from which the message payload data 775 was generated. For example, if the music skill system generated the content identifying data 745, the communications system 135 may send the message payload data 775 to the music skill system.

The content skill system 125*c* may determine (912) output data corresponding to the message payload data 775. For example, a music skill system may determine audio data corresponding to a song, a recipe skill system may determine text data and/or image data corresponding to a recipe, a photo skill system may determine image data corresponding to a photo, etc. In at least some embodiments, the communications system 135 may send the message payload data 775 to the content skill system 125*c* using the sharing skill system 125*a* as an intermediary. After determining the output data, the content skill system 125*c* may send (914) the output data to the recipient device 110*b*, which may output the content (e.g., audio of the song, synthesized speech and/or an image of the recipe, an image of the photo, etc.) to the recipient user 7. In at least some embodiments, upon the output data being send to the recipient device 110*b*, the sharing speech controllable device 110*a* may be caused to output content indicating the recipient user 7 has viewed the shared content.

Figure 10:
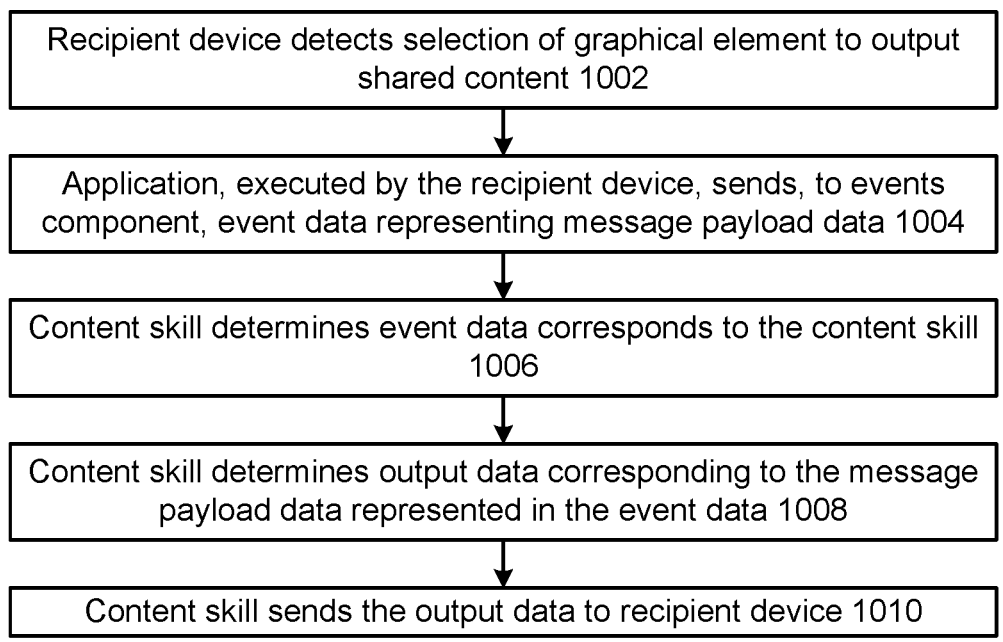
FIG. 10 is a process flow diagram illustrating processing that may be performed in response to a user selecting a graphical element to output shared content, according to embodiments of the present disclosure.

As described herein above, a recipient device 110*b* may be a smart phone, tablet, or the like that executes an application in communication with the speech processing system 120. The application may cause the recipient device 110*b* to display a graphical element that, when selected, indicates the recipient user 7 wants the shared content, represented in the message data 785 sent to the recipient device 110*b*, to be output. Referring to FIG. 10, the recipient device 110*b* may detect (1002) selection of the graphical element. In response, the application may send (1004), to the events system 750, event data representing the message payload data 775 in the message data 785 previously sent to the recipient device 110*b*. The event data may also include a device identifier of the recipient device 110*b*.

Thereafter, the content skill system 125*c* determines (1006) the event data corresponds to the content skill system 125*c*. In response, the content skill system 125*c* determines (1008) output data corresponding to the message payload data 775 represented in the event data, and sends (1010) the output data to the recipient device 110*b*. In this situation, the output data may be routed to the application executed by the recipient device 110*b*, and the application may cause another application of the recipient device 110*b* to output the shared content of the output data. For example, if the shared content is a song, a music application may be used to output the song. For further example, if the shared content is a photo, a photos application may be used to display the photo.

When the content skill system 125*c* sends the output data to the recipient device 110*b*, the content skill system 125*c* may also send the device identifier, of the recipient device 110*b*, and the message identifier (corresponding to the message being output) to the context aggregation component 400 for storage.

In some situations, the recipient user 7 may provide a user input reacting to the shared content. For example, the user input may be selection of a graphically displayed emotion icon (e.g., emoji), speech (e.g., such as "that song was great," "love the photo," etc.), etc. The recipient device 110*b* may send data representing the reaction to the sharing skill system 125*a*. The sharing skill system 125*a* may query the context aggregation component 400 for context data associated with the identifier of the recipient device 110*b*, and may receive the message identifier in response. The sharing skill system 125*a* may then cause the data representing the reaction to be associated with the message data 785 (in the message storage 740) associated with the message identifier. Such may enable the sharing user 5 to receive the reaction of the recipient user 7.

Figure 11:
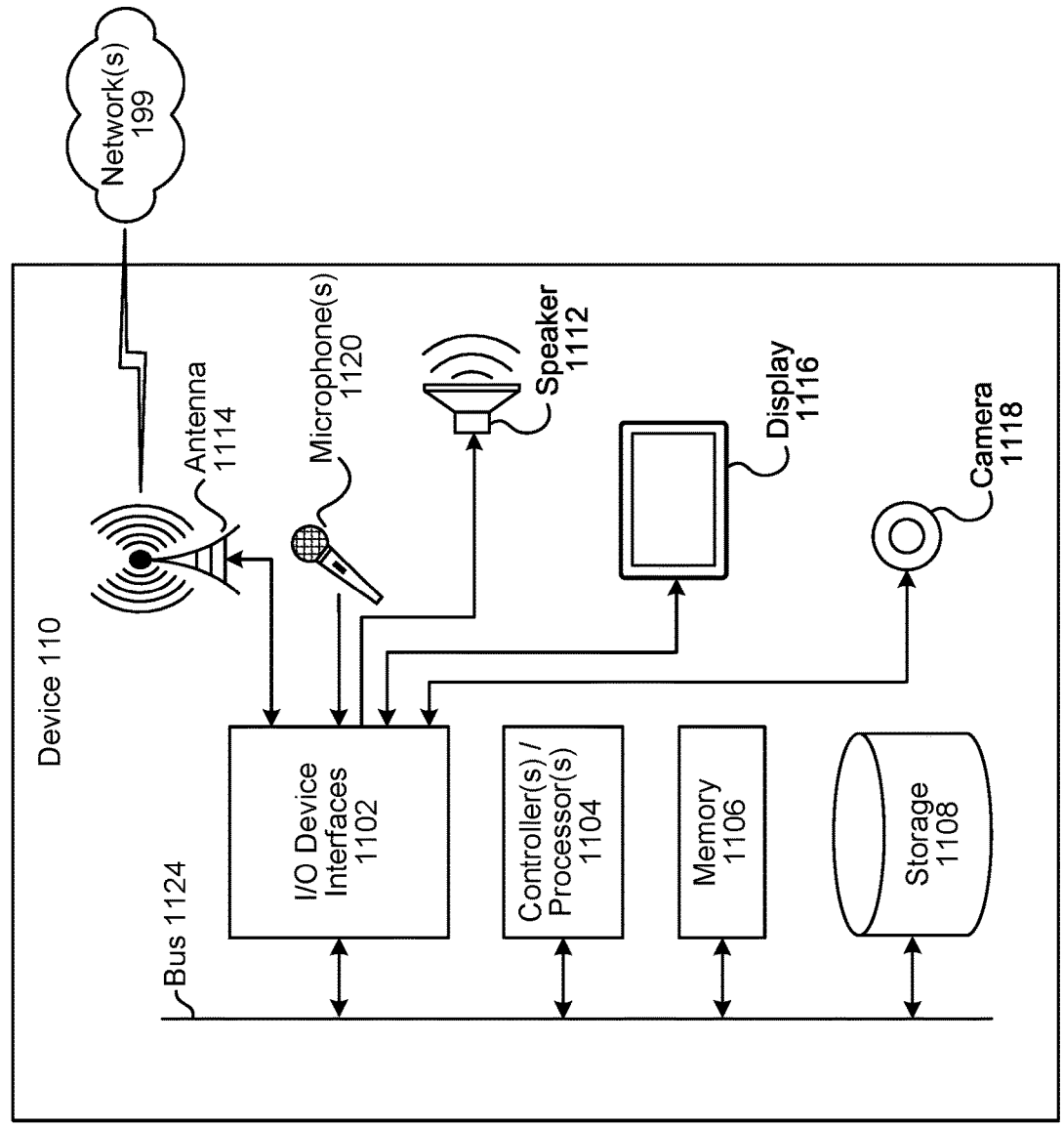
FIG. 11 is a block diagram conceptually illustrating example components of a device, according to embodiments of the present disclosure.
Figure 12:
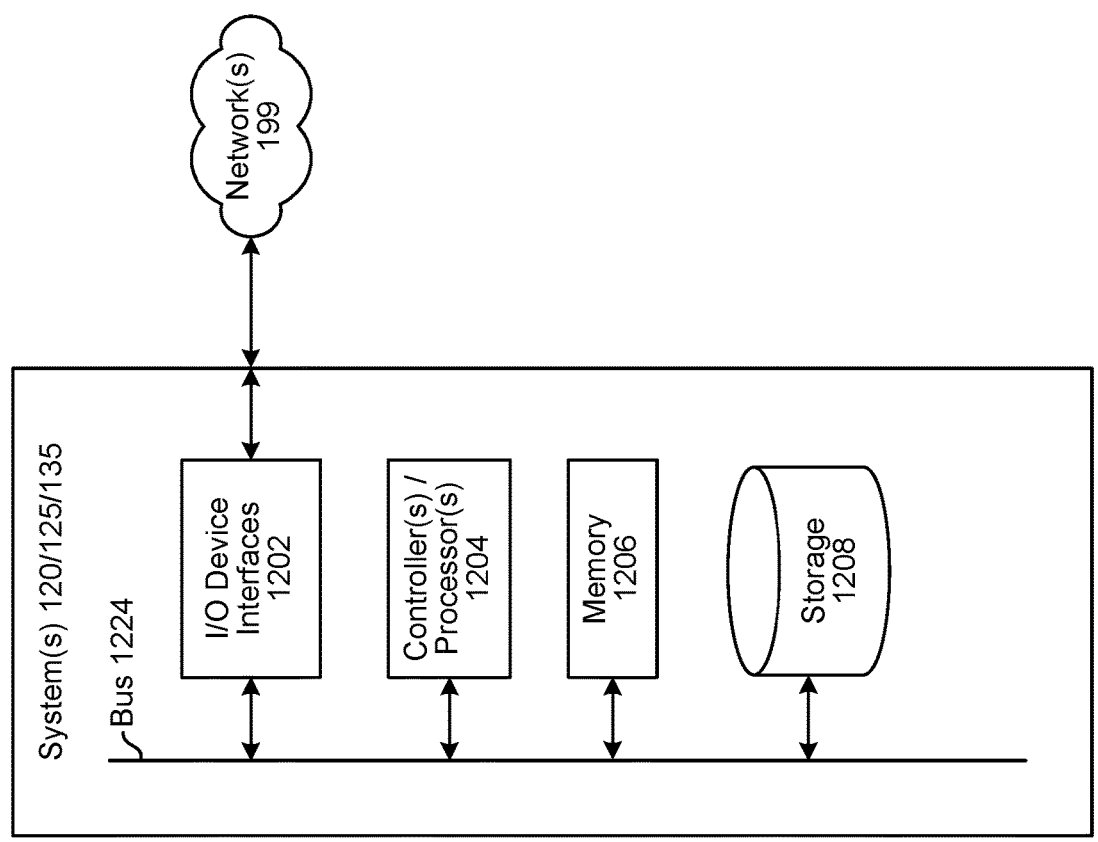
FIG. 12 is a block diagram conceptually illustrating example components of a system, according to embodiments of the present disclosure.

FIG. 11 is a block diagram conceptually illustrating a device 110 that may be used with the speech processing system 120. FIG. 12 is a block diagram conceptually illustrating example components of a remote device, such as the speech processing system 120, a skill system 125, or the communications system 135. A system (120/125/135) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125/135) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125/135) may be included in the system 100 of the present disclosure, such as one or more speech processing systems 120 for performing ASR processing, one or more speech processing systems 120 for performing NLU processing, one or more skill systems 125, one or more communications systems 135, etc. In operation, each of these systems may include computer-readable and computer-executable instructions that reside on the respective device (120/125/135), as will be discussed further below.

Each of these devices (110/120/125/135) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125/135) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125/135) may also be connected to removable or external non-volatile memory and/or storage (such as a removable memory card, memory key drive, networked storage, etc.) through respective input/output device interfaces (1102/1202).

Computer instructions for operating each device (110/120/125/135) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125/135) includes input/output device interfaces (1102/1202). A variety of components may be connected through the input/output device interfaces (1102/1202), as will be discussed further below. Additionally, each device (110/120/125/135) may include an address/data bus (1124/1224) for conveying data among components of the respective device. Each component within a device (110/120/125/135) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the speech processing system 120, the skill system 125, and/or the communications system 135 may include their own dedicated processors, memory, and/or storage. Alternatively, one or more of the components of the device 110, the speech processing system 120, the skill system 125, and/or the communications system 135 may utilize the I/O interfaces (1102/1202), processor(s) (1104/1204), memory (1106/1206), and/or storage (1108/1208) of the device 110, the speech processing system 120, the skill system 125, or the communications system 135, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the speech processing system 120, a skill system 125, and the communications system 135, as described herein, are illustrative, and may be located as a stand-alone device or may be included, in whole or in part, as a component of a larger device or system.

Figure 13:
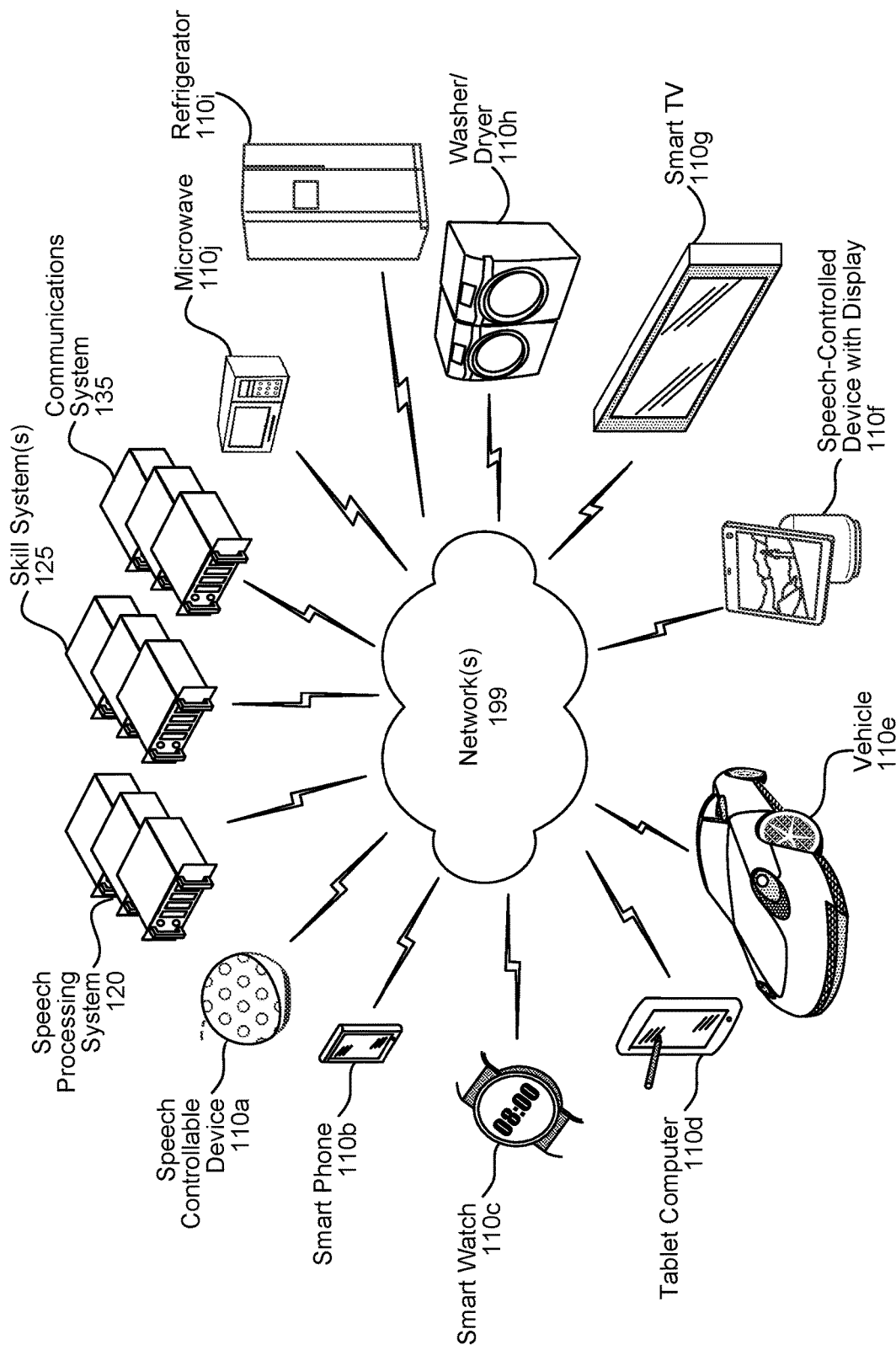
FIG. 13 illustrates an example of a computer network for use with the overall system, according to embodiments of the present disclosure.

As illustrated in FIG. 13, multiple devices (110*a*-110*j*, 120, 125, 135) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the speech processing system 120, the skill system 125, the communications system 135, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device associated with a device identifier, first audio data representing a first natural language input, the first audio data being associated with a user profile identifier;
    processing the first audio data to determine the first natural language input requests content be sent to a recipient;
    determining the recipient corresponds to first contact data included in contact list data associated with the user profile identifier;
    sending the device identifier to a processing component configured to output the content;
    receiving, from the processing component, a uniform resource locator (URL) configured to be used to access the content;
    processing the URL to generate message payload data, the message payload data including information in the URL corresponding to the content;
    storing first data associating the first contact data and the message payload data;
    determining a second device represented in the first contact data; and
    sending the message payload data to the second device.

2. The computer-implemented method of claim 1, wherein:
    the processing component is configured to output a first content type; and
    sending the device identifier to the processing component causes the processing component to:
        determine second data representing first content and second content are both being output by the first device;
        determine the first content corresponds to the first content type;
        determine the second content corresponds to a second content type; and
        generate the URL to represent the first content.

3. The computer-implemented method of claim 1, further comprising:
    determining a content type representing the content; and
    determining the processing component corresponds to the content type,
    wherein sending the device identifier to the processing component is based on the processing component corresponding to the content type,
    wherein sending the device identifier to the processing component causes the processing component to:
        determine second data representing the content is being output by the first device; and
        generate the URL based on the second data.

4. The computer-implemented method of claim 1, further comprising:
  storing the first data to associate the first contact data, the message payload data, and a first indicator representing the message payload data has been sent to the second device;
  sending, to an event bus accessible by the processing component, event data representing the first data;
  after sending the event data, receiving, from the processing component, second data representing the processing component has granted permission for the recipient to view the content; and
  after receiving the second data, storing updated first data associating the first contact data, the message payload data, and a second indicator representing the recipient has been granted permission to view the content.

5. A computer-implemented method comprising:
  receiving, from a first device associated with a device identifier, first audio data representing a first natural language input;
  processing the first audio data to determine the first natural language input requests content be sent to a first recipient;
  sending the device identifier to a processing component configured to output the content;
  receiving, from the processing component, first data representing the content;
  processing the first data to generate first message payload data, the first message payload data including information corresponding to the content;
  determining a second device associated with the first recipient; and
  sending the first message payload data to the second device.

6. The computer-implemented method of claim 5, further comprising:
  prior to receiving the first audio data, receiving, from the first device, second data representing the content is at least one of:
    being output as audio by the first device; or
    being presented in a foreground of a display associated with the first device;
  wherein sending the device identifier to the processing component causes the processing component to generate the first data based on the second data.

7. The computer-implemented method of claim 5, further comprising:
  storing second data associating the first message payload data and a first indicator representing the first message payload data has been sent to the second device;
  sending, to an event bus accessible by the processing component, event data representing the second data;
  after sending the event data, receiving, from the processing component, third data representing the processing component has granted permission for the first recipient to view the content; and
  after receiving the third data, storing updated second data associating the first message payload data and a second indicator representing the first recipient has been granted permission to view the content.

8. The computer-implemented method of claim 5, further comprising:
  receiving, from the second device, second audio data representing a second natural language input;
  processing the second audio data to determine the second natural language input requests the content be output; and
  based on the second natural language input requesting the content be output, sending the first message payload data to the processing component, sending of the first message payload data causing the processing component to send the content to the second device.

9. The computer-implemented method of claim 5, wherein:
  receiving the first data comprises receiving a uniform resource locator (URL) configured to be used to access the content; and
  processing the first data comprises processing the URL to generate the first message payload data.

10. The computer-implemented method of claim 5, wherein the first natural language input requests the content be sent to a group of recipients, and wherein the computer-implemented method further comprises:
  determining the group of recipients corresponds to the first recipient and a second recipient;
  determining a third device associated with the second recipient; and
  sending the first message payload data to the third device.

11. The computer-implemented method of claim 10, further comprising:
  determining first time data representing when the second recipient became a member of the group of recipients;
  determining second message payload data associated with second time data occurring prior to the first time data, the second time data representing when the second message payload data was generated; and
  based on the second time data occurring prior to the first time data, sending, to the third device, the first message payload data without sending the second message payload data.

12. The computer-implemented method of claim 5, further comprising:
  processing the first audio data to generate natural language understanding (NLU) output data including an intent corresponding to a content type associated with the content; and
  determining the processing component based on the intent corresponding to the content type.

13. A computing system comprising:
  at least one processor; and
  at least one memory comprising instructions that, when executed by the at least one processor, cause the computing system to:
    receive, from a first device associated with a device identifier, first audio data representing a first natural language input;
    process the first audio data to determine the first natural language input requests content be sent to a first recipient;
    send the device identifier to a processing component configured to output the content;
    receive, from the processing component, first data representing the content;
    process the first data to generate first message payload data, the first message payload data including information corresponding to the content;
    determine a second device associated with the first recipient; and
    send the first message payload data to the second device.

14. The computing system of claim 13, wherein the at least one memory further comprises instructions that, when executed by the at least one processor, further cause the computing system to:

prior to receiving the first audio data, receive, from the first device, second data representing the content is:
being output as audio by the first device; or
being presented in a foreground of a display associated with the first device;
wherein sending the device identifier to the processing component causes the processing component to generate the first data based on the second data.

15. The computing system of claim 13, wherein the at least one memory further comprises instructions that, when executed by the at least one processor, further cause the computing system to:
store second data associating the first message payload data and a first indicator representing the first message payload data has been sent to the second device;
send, to an event bus accessible by the processing component, event data representing the second data;
after sending the event data, receive, from the processing component, third data representing the processing component has granted permission for the first recipient to view the content; and
after receiving the third data, store updated second data associating the first message payload data and a second indicator representing the first recipient has been granted permission to view the content.

16. The computing system of claim 13, wherein the at least one memory further comprises instructions that, when executed by the at least one processor, further cause the computing system to:
receive, from the second device, second audio data representing a second natural language input;
process the second audio data to determine the second natural language input requests the content be output; and
based on the second natural language input requesting the content be output, send the first message payload data to the processing component, sending of the first message payload data causing the processing component to send the content to the second device.

17. The computing system of claim 13, wherein:
the instructions to receive the first data further comprise instructions that, when executed by the at least one processor, further cause the computing system to receive a uniform resource locator (URL) configured to be used to access the content; and
the instructions to process the first data further comprise instructions that, when executed by the at least one processor, further cause the computing system to process the URL to generate the first message payload data.

18. The computing system of claim 13, wherein the first natural language input requests the content be sent to a group of recipients, and wherein the at least one memory further comprises instructions that, when executed by the at least one processor, further cause the computing system to:
determine the group of recipients corresponds to the first recipient and a second recipient;
determine a third device associated with the second recipient; and
send the first message payload data to the third device.

19. The computing system of claim 18, wherein the at least one memory further comprises instructions that, when executed by the at least one processor, further cause the computing system to:
determine first time data representing when the second recipient became a member of the group of recipients;
determine second message payload data associated with second time data occurring prior to the first time data, the second time data representing when the second message payload data was generated; and
based on the second time data occurring prior to the first time data, send, to the third device, the first message payload data without sending the second message payload data.

20. The computing system of claim 13, wherein the at least one memory further comprises instructions that, when executed by the at least one processor, further cause the computing system to:
process the first audio data to generate natural language understanding (NLU) output data including an intent corresponding to a content type associated with the content; and
determine the processing component based on the intent corresponding to the content type.

* * * * *